US012135235B2

(12) United States Patent
Brower

(10) Patent No.: US 12,135,235 B2
(45) Date of Patent: *Nov. 5, 2024

(54) PIPELINE CONDITION SENSING FOR PROTECTING AGAINST THEFT OF A SUBSTANCE FLOWING THROUGH A PIPELINE

(71) Applicant: Astro Technology Group, LLC, Houston, TX (US)

(72) Inventor: David Verl Brower, Houston, TX (US)

(73) Assignee: Astro Technology Group LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,521

(22) Filed: May 8, 2023

(65) Prior Publication Data

US 2023/0400349 A1 Dec. 14, 2023

Related U.S. Application Data

(63) Continuation of application No. 17/730,619, filed on Jun. 10, 2022, now Pat. No. 11,698,291.

(51) Int. Cl.
*G01H 9/00* (2006.01)
(52) U.S. Cl.
CPC ................... *G01H 9/004* (2013.01)
(58) Field of Classification Search
None
See application file for complete search history.

(56) References Cited

U.S. PATENT DOCUMENTS

| 5,590,982 | A | 1/1997 | Huete |
| 5,964,550 | A | 10/1999 | Blandford et al. |
| 7,447,614 | B2 | 11/2008 | Ghaboussi et al. |
| 8,127,801 | B2 | 3/2012 | Brower |
| 8,612,186 | B2 | 12/2013 | Wu et al. |
| 9,573,662 | B2 | 2/2017 | Amate-Lopex et al. |
| 9,677,951 | B2 | 6/2017 | Li |
| 9,719,309 | B2 * | 8/2017 | Brower .................. E21B 17/01 |
| 9,915,579 | B1 * | 3/2018 | Brower ................. G01L 11/025 |
| 10,031,044 | B2 | 7/2018 | Kumar et al. |
| 10,746,016 | B2 | 8/2020 | Barry et al. |

(Continued)

*Primary Examiner* — Brandi N Hopkins
*Assistant Examiner* — Nigel H Plumb
(74) *Attorney, Agent, or Firm* — David O. Simmons; IVC Patent Agency

(57) ABSTRACT

Disclosed are embodiments of apparatuses, systems and methods for detecting activities associated with theft of a substance flowing through the pipeline. Such activities are determined by correlating pipeline sensor signals to anomalistic reference signals characterizing activity(ies) known to be associated with theft of a substance flowing through a pipeline—e.g., formation of a hole within a tubular member of the pipeline, a liquid being pumped into the pipeline through a wall of a tubular member thereof, a metallic article (e.g., drill) coming into contact with a tubular member of the pipeline, and the like. Advantageously, fiber optic sensors are utilized for such monitoring of vibrations and other operating conditions in elongated tubular members making up the pipeline thereby enabling activities associated with theft of a substance from the pipeline to be effectively and inexpensively detected over extended lengths of pipelines.

26 Claims, 22 Drawing Sheets

(56) References Cited

U.S. PATENT DOCUMENTS

| | | | |
|---|---|---|---|
| 11,698,291 B1* | 7/2023 | Brower | G01H 9/004 |
| | | | 73/655 |
| 2005/0283276 A1 | 12/2005 | Prescott et al. | |
| 2008/0083533 A1* | 4/2008 | Malone | E21B 34/14 |
| | | | 166/381 |
| 2009/0077982 A1 | 3/2009 | Brower | |
| 2010/0229662 A1 | 9/2010 | Brower | |
| 2011/0219866 A1* | 9/2011 | Brower | G01F 1/00 |
| | | | 73/152.31 |
| 2014/0290374 A1 | 10/2014 | Brower | |
| 2014/0354974 A1 | 12/2014 | Brower | |
| 2014/0354975 A1 | 12/2014 | Brower | |
| 2016/0326861 A1 | 11/2016 | Brower | |

* cited by examiner

PIPELINE CONDITION SENSING FOR PROTECTING AGAINST THEFT OF A SUBSTANCE FLOWING THROUGH A PIPELINE

CROSS-REFERENCE TO RELATED APPLICATIONS

This continuation patent application claims priority from co-pending U.S. Non-Provisional patent application having Ser. No. 17/730,619, filed 10 Jun. 2022, entitled "PIPELINE CONDITION SENSING FOR PROTECTING AGAINST THEFT OF A SUBSTANCE FLOWING THROUGH A PIPELINE", now issued as U.S. Pat. No. 11,698,291, having a common applicant herewith and being incorporated herein in its entirety by reference.

FIELD OF THE DISCLOSURE

The disclosures made herein relate generally to monitoring of operating conditions within structural members and, more particularly, to apparatuses, methods and systems for monitoring operating conditions of pipeline for detecting presence of malicious activities thereon.

BACKGROUND

Pipelines that carry fluids such as refined or unrefined liquid hydrocarbon products or gaseous hydrocarbon products are well known. Such pipelines are examples of structural members for which it is necessary to monitor operating condition information thereof. Such structural members can have a solid cross sectional construction or have an interior space. In the specific case of a pipeline, the structural members are typically elongated tubular members (e.g., pipes) having a round cross-sectional shape defining an interior space. Such elongated tubular members used in land-based pipelines are a prime example of structural members for which it is necessary to monitor operating condition information thereof.

It is well known that pipelines are often subjected to various types of adverse operating conditions that can affect the intended transport and/or delivery of product flowing through such pipelines. Examples of such adverse operating conditions include, but are not limited to, pipeline clogs, pipeline breaches, pipeline tampering and the like. Pipeline clogs often occurs due to build-up of naturally occurring thixotropic components (e.g., wax deposits), build-up of naturally occurring hydrate-based components (e.g., ice) and the like. Pipeline breaches can result from naturally occurring events (e.g., earthquakes, tornadoes, etc.), from man-made events (e.g., drilling/tapping of holes in the pipeline), tampering with control values of the pipeline (e.g., product dump valves), and the like.

With respect to pipeline breaches that occur due to manmade events, it is also well known that such manmade pipeline breaches are often a result of malicious activities directed to stealing product that is flowing through the pipeline. For example, in the case of a pipeline carrying gasoline or other refined fuel product, theft of such product involves drilling/tapping into the pipeline at a remote location and extracting the product into a container. In many cases, due to the volume of product available and the remote location(s) at which such theft can be undertaken, it is possible for literally millions of dollars of product to be stolen from a given pipeline on an annual basis. In addition to the loss of revenue from the stolen product, there exists the potential for significant damage or destruction of portions of the pipeline that can further adversely impact revenue generation.

Some pipeline operators monitor the flow of product through a pipeline in a manner that provides the potential for detecting theft of product by unauthorized extraction of such product. For example, a pipeline operator may monitor volumetric flow, pressure and/or the like at various points along a length of the pipeline to determine if product is being stolen from the pipeline. In an attempt to circumvent a pipeline operator monitoring the flow of product through the pipeline for allowing the detect of theft, criminals engaged in the theft of product from such a pipeline have been known to manipulate the flow of such product in an attempt to preclude such product flow monitoring from detecting product being stolen by unauthorized extraction thereof from the pipeline. To this end, for example, criminals have been known to inject a relatively low-cost or free liquid such as water into a pipeline at a location adjacent to a location at which product is being extracted. This injected liquid serves to maintain flow characteristics in the pipeline and thereby prevent detection of the product being stolen by its unauthorized extraction from the pipeline.

Therefore, apparatuses, systems and methods configured to monitor vibrations and other signals in a pipeline to detect tampering that is indicative of theft of product from the pipeline and/or to detects operating conditions of the pipeline that are indicative of theft of product therefrom would be advantageous, desirable and useful.

SUMMARY OF THE DISCLOSURE

Embodiments of the present invention are directed to apparatuses, systems and methods configured to monitor vibrations and other signals in a pipeline to detect adverse pipeline operating conditions such as pipeline clogs, pipeline breaches, pipeline tampering, and the like. In some embodiments, such adverse pipeline operating conditions are indicative of activities associated with theft of product from the pipeline. In preferred embodiments, apparatuses, systems and methods utilize fiber optic sensors for monitoring vibrations and other signals in elongated tubular members making up the pipeline. To this end, such fiber optic sensors can be strategically placed at a plurality of locations along a length of each elongated tubular member (e.g., every 1000 feet to every half mile) thereby allowing monitoring of critical operating conditions such as strain, temperature and pressure of the elongated tubular member and/or a fluid therein, as well as vibrations and other signals indicative of adverse product flow conditions and pipeline operating conditions.

Advantageously, embodiments of the present invention provide a simple yet effective and reliable approach of monitoring pipeline operating conditions for detecting pipeline breach events and/or tampering events. Such detection of pipeline breach events and/or tampering events is facilitated by monitoring signal output of fiber optic sensors strategically placed along a length of each segment/branch of the pipeline. In embodiments of the present invention, spacing of the fiber optic sensors is implemented for adverse events to be isolated to a suitable degree of resolution (e.g., within 1000 feet to half mile of the location of such event). Furthermore, embodiments of the present invention advantageously allow for such fiber optic sensors to be installed before or after deployment of the elongated tubular members. In preferred embodiments, the fiber optic sensors are integrated into respective sensor housing, which allow a plurality of fiber optic sensors to the mounted on an elongated tubular member through mounting of the sensor housing thereon. Operating condition information, vibration information and the like from the fiber optic sensors of a plurality of sensor housings is communicated to a data acquisition system through one or more optical fibers.

In one embodiment of the present invention, a method of detecting operating conditions in a pipeline that are indicative of an adverse flow event comprises a plurality of operations. An operation of receiving one or more signals outputted from one or more fiber optic sensors each mounted on a respective one of a plurality of tubular members that jointly define a flow passage of the pipeline through which fluid material flows is performed, followed by an operation of analyzing each one of the one or more received signals to identify at least a portion of the one or more received signals indicating a potential flow affecting event for the fluid material within the flow passage of the tubular members being performed. Thereafter, an operation of correlating the at least a portion of the one or more received signals indicating the potential flow affecting event to signal characterizing information for a known flow affecting event for the pipeline is performed and then an operation of outputting a signal conveying the known flow affecting event is performed.

In another embodiment of the present invention, a fluid transfer pipeline system comprises a pipeline, a plurality of sensors and a data processing unit. The pipeline has a flow passage therein through which fluid material can flow. The plurality of sensors is mounted on an exterior surface of the pipeline along a length thereof. The data processing unit is coupled to each of the sensors for enabling reception of signals therefrom. The data processing unit is adapted to analyze a signal outputted from each one of the sensors for determining when at least a portion of one or more signals outputted by the one or more sensors indicates a potential flow affecting event for the fluid material within the flow passage of the pipeline and to correlate the at least a portion of the one or more outputted signals indicating the potential flow affecting event to signal characterizing information for a known flow affecting event for the pipeline.

In another embodiment of the present invention, a pipeline security apparatus comprises a plurality of fiber optic sensor assemblies and a data processing unit coupled to each of the fiber optic sensors for receiving a signal outputted therefrom. The fiber optic sensor assemblies are each adapted for being mounted on an exterior surface of a respective one of a plurality of tubular members of a pipeline at a respective position thereof. Each one of the fiber optic sensor assemblies outputs a signal characterizing a force being exerted on the pipeline tubular member at the respective position thereof. The data processing unit is adapted to analyze the signal outputted from each one of the sensors for determining when at least a portion of one or more signals outputted by the one or more sensors indicates a potential flow affecting event for fluid material within a flow passage of a respective one of the tubular members and to correlate the at least a portion of the one or more outputted signals indicating the potential flow affecting event to signal characterizing information for a known flow affecting event for the pipeline.

In another embodiment of the present invention, a method of managing operating of a pipeline comprises a plurality of operations. An operation of receiving a signal corresponding to pipeline operation characterizing information generated by at least one of a plurality of sensors mounted on an exterior surface of a pipeline having fluid material flowing through a flow passage thereof is performed. Thereafter an operation of correlating the pipeline operation characterizing information signal to signal characterizing information corresponding to at least one of a plurality of known flow affecting events for the pipeline is performed. After correlating the pipeline operation characterizing information signal of the at least one sensor to the signal characterizing information for the at least one of the known flow affecting events, at least one of an operation of causing a change in flow of the fluid material through the flow passage of the pipeline and an operation of causing a signal characterizing the at least one of the known flow-affecting events to be transmitted is performed.

In another embodiment of the present invention, a fluid transfer pipeline system comprises a pipeline having a flow passage therein through which fluid material can flow, a plurality of sensors mounted on an exterior surface of the pipeline along a length thereof and a data processing unit coupled to each of the sensors for enabling reception of signals therefrom. The data processing unit is adapted to receive a signal corresponding to pipeline operation characterizing information generated by at least one of the sensors, to correlate the pipeline operation characterizing information signal to signal characterizing information corresponding to at least one of a plurality of known flow affecting events for the pipeline and to cause at least one of a change in flow of the fluid material through the flow passage of the pipeline and a signal characterizing the at least one of the known flow affecting events to be transmitted.

In another embodiment of the present invention, a pipeline security apparatus comprises a plurality of fiber optic sensor assemblies each adapted for being mounted on an exterior surface of a pipeline at a respective position thereof and a data processing unit coupled to each of the fiber optic sensors for receiving a signal outputted therefrom. Each one of the fiber optic sensor assemblies outputs a signal characterizing a force being exerted on the pipeline at the respective position thereof. The data processing unit is adapted to receive a signal corresponding to pipeline operation characterizing information generated by at least one of the sensors, to correlate the pipeline operation characterizing information signal to signal characterizing information corresponding to at least one of a plurality of known flow affecting events for the pipeline and to cause at least one of a change in flow of the fluid material through the flow passage of the pipeline and a signal characterizing the at least one of the known flow affecting events to be transmitted.

These and other objects, embodiments, advantages and/or distinctions of the present invention will become readily apparent upon further review of the following specification, associated drawings and appended claims.

DETAILED DESCRIPTION

Figure 1:
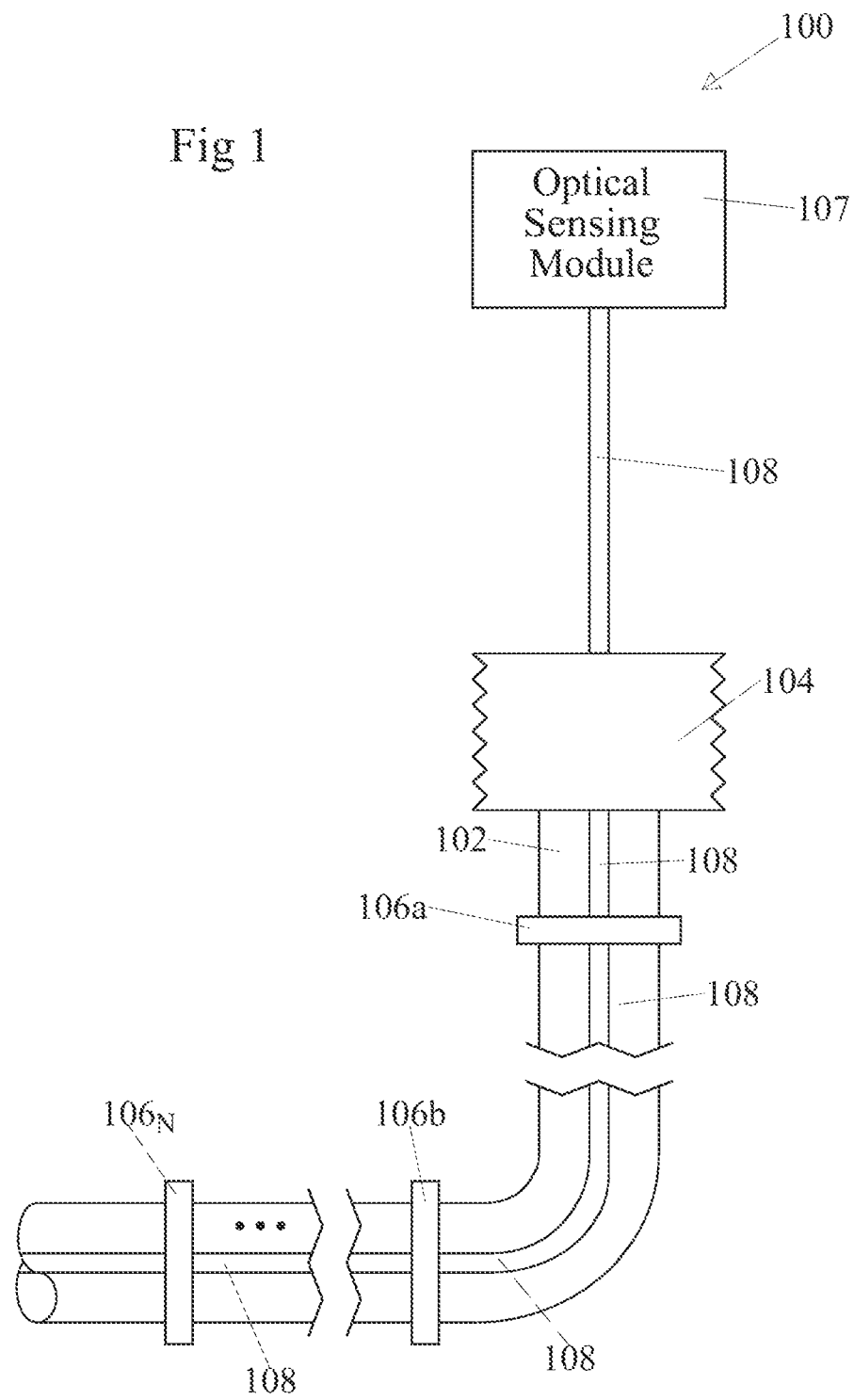
FIG. 1 is a diagrammatic view showing an operating condition monitoring apparatus configured in accordance with an embodiment of the present invention.

FIG. 1 shows an apparatus 100 configured in accordance with an embodiment of the present invention. The apparatus 100 includes an elongated tubular member 102 that is connected to a support structure 104. A plurality of sensor housing assemblies 106a-106n are mounted in a spaced-apart arrangement along a length of the elongated tubular member 102. The sensor housing assemblies 106a-106n are connected to each other and to an optical sensing module 107, such as at a signaling port thereof, by a fiberoptic cable 108.

The sensor housing assemblies 106a-106n, the optical sensing module 107 and the fiberoptic cable 108 jointly provide for operating condition information for the elongated tubular member 102, a fluid within the elongated tubular member 102, or both to be generated, communicated and monitored. As discussed below in greater detail, each one of the sensor housing assemblies 106a-106n includes one or more fiber optic sensors (not specifically shown in FIG. 1) that are configured for generating specific respective operating condition information. Examples of such operating condition information includes, but is not limited to, strain within a wall of the elongated tubular member 102, pressure within an interior space of the elongated tubular member 102, torsion applied to the elongated tubular member 102, temperature of the wall or surface of the elongated tubular member 102, temperature of a fluid within the interior space of the elongated tubular member 102, and flow confirmation of a fluid within the interior space of the elongated tubular member 102.

Embodiments of the present invention are not limited to any particular elongated tubular member 102 or support structure 104. However, in many applications, a given elongated tubular member will typically be used in association with a corresponding support structure. For example, where the support structure is a tension leg platform (TLP), an elongated tubular member thereof may be a tension leg or a riser. In another example, where the support structure is a wellhead, an elongated tubular member thereof may be a pipeline or the like.

Figure 2:
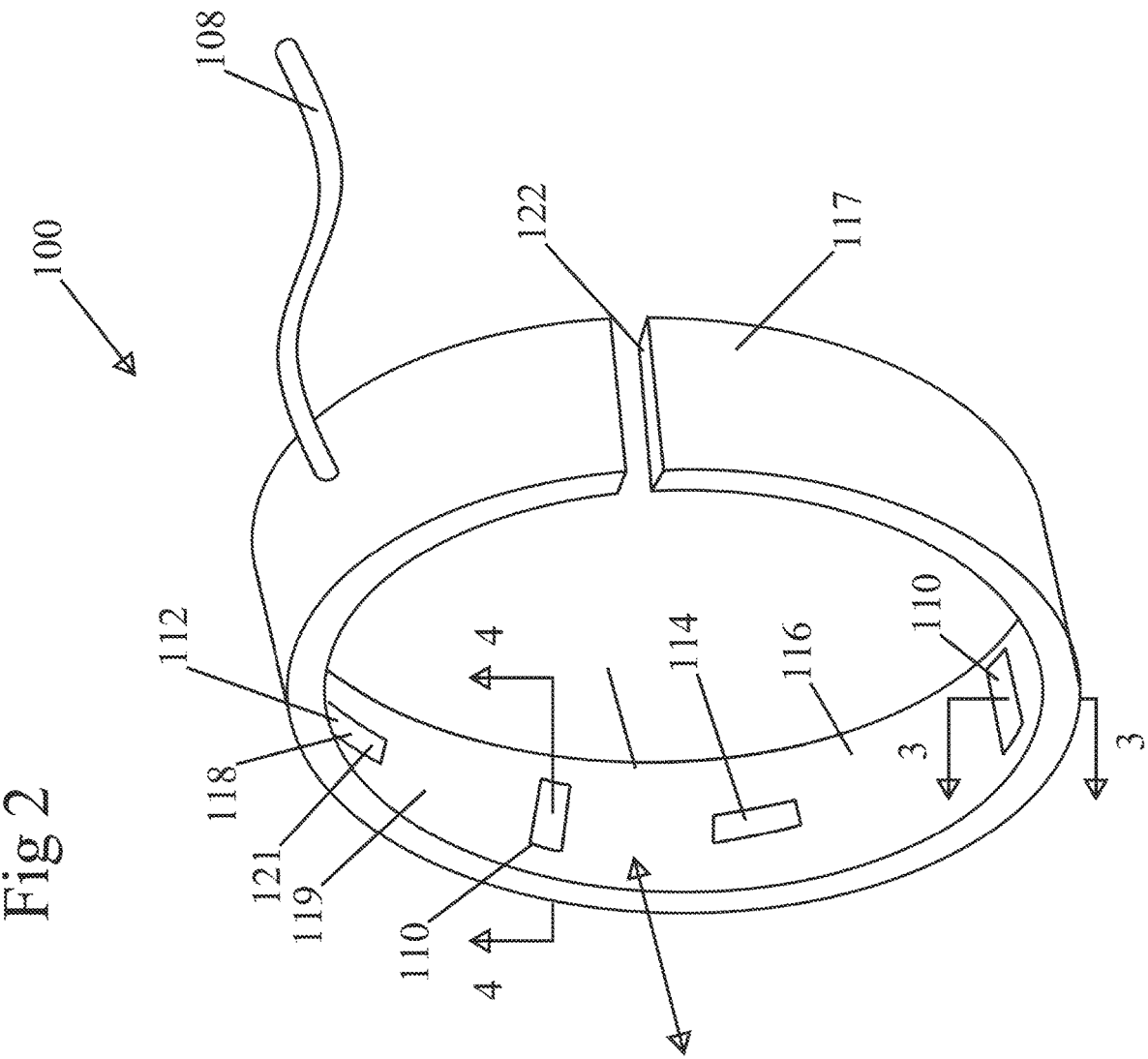
FIG. 2 is a perspective view of a sensor housing assembly configured in accordance with an embodiment of the present invention.
Figure 3:
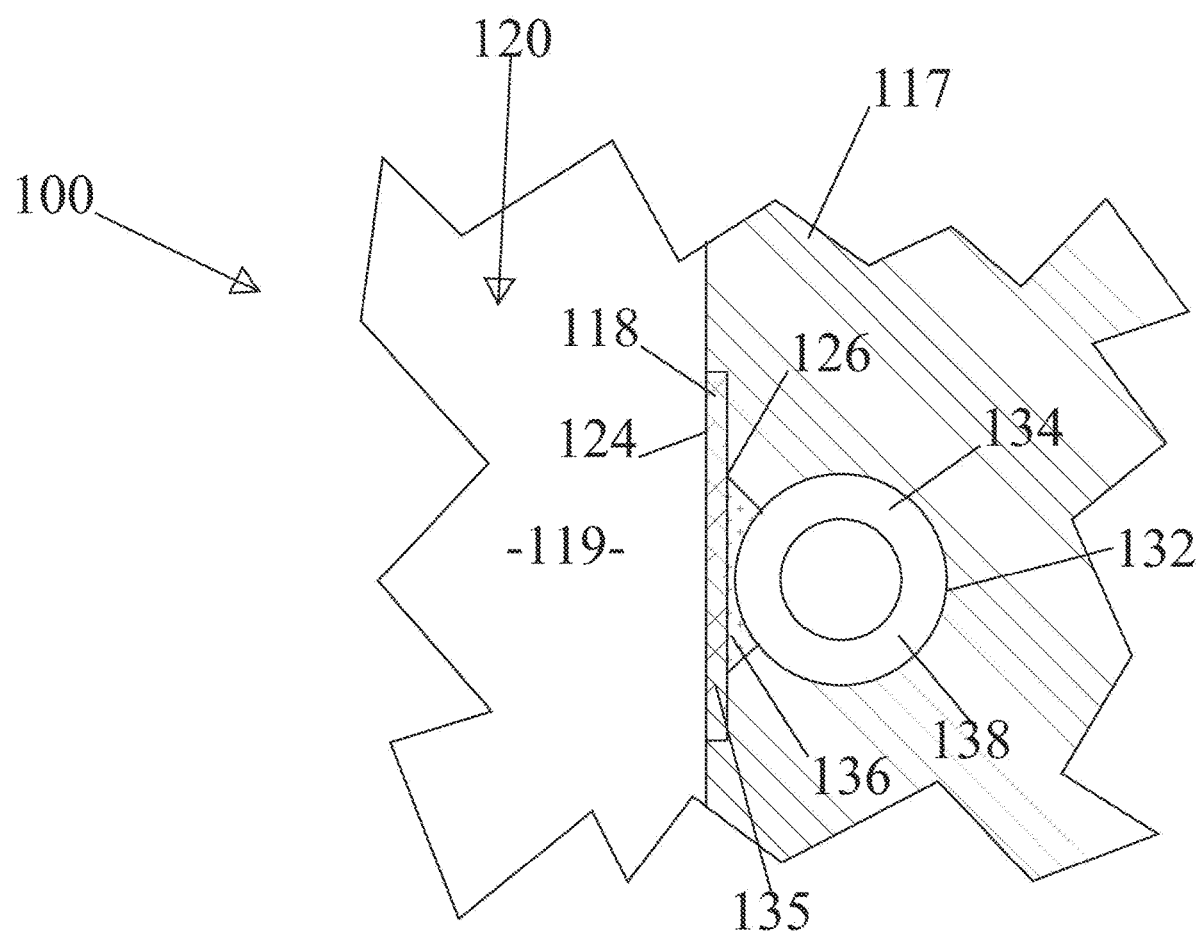
FIG. 3 is a fragmentary cross-sectional view taken along the line 3-3 in FIG. 2.
Figure 4:
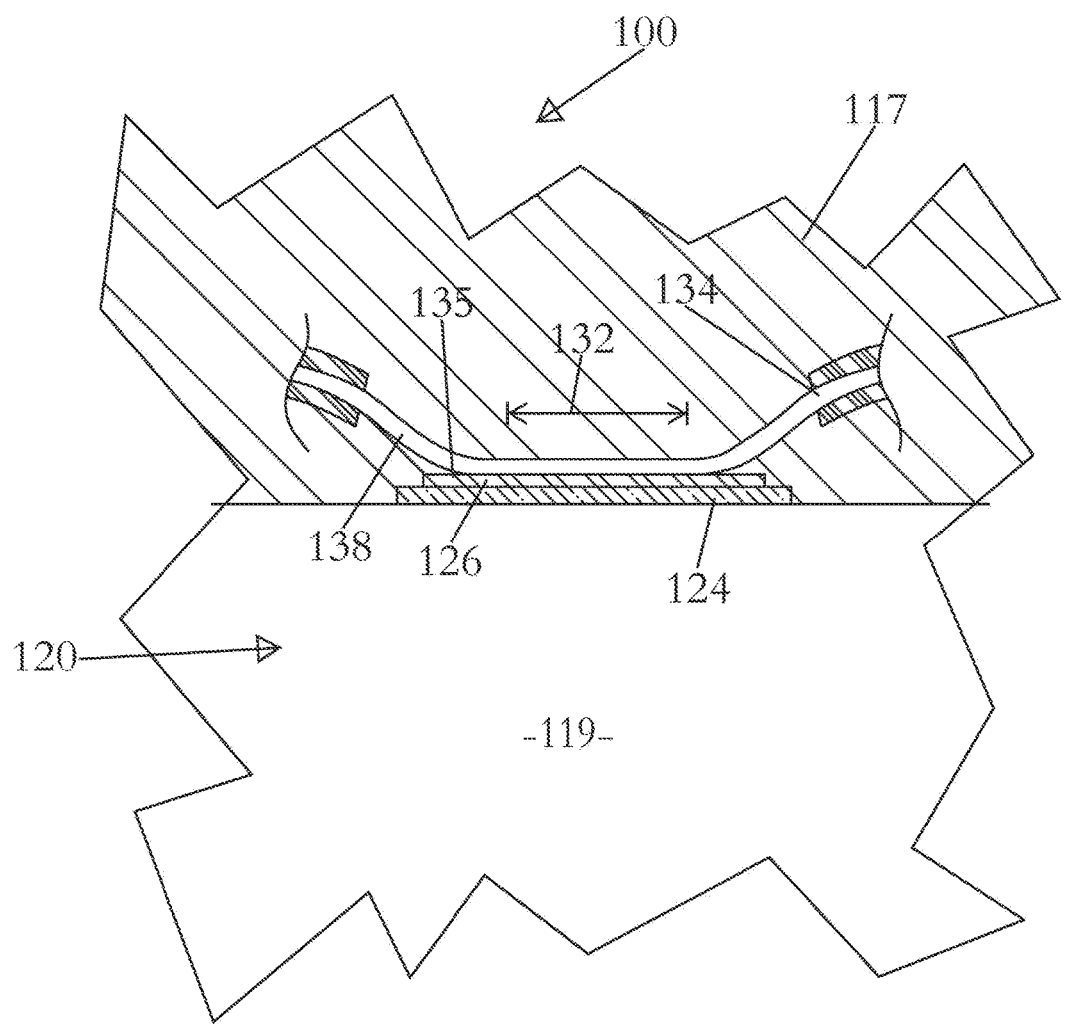
FIG. 4 is a fragmentary cross-sectional view taken along the line 4-4 in FIG. 2.
Figure 5:
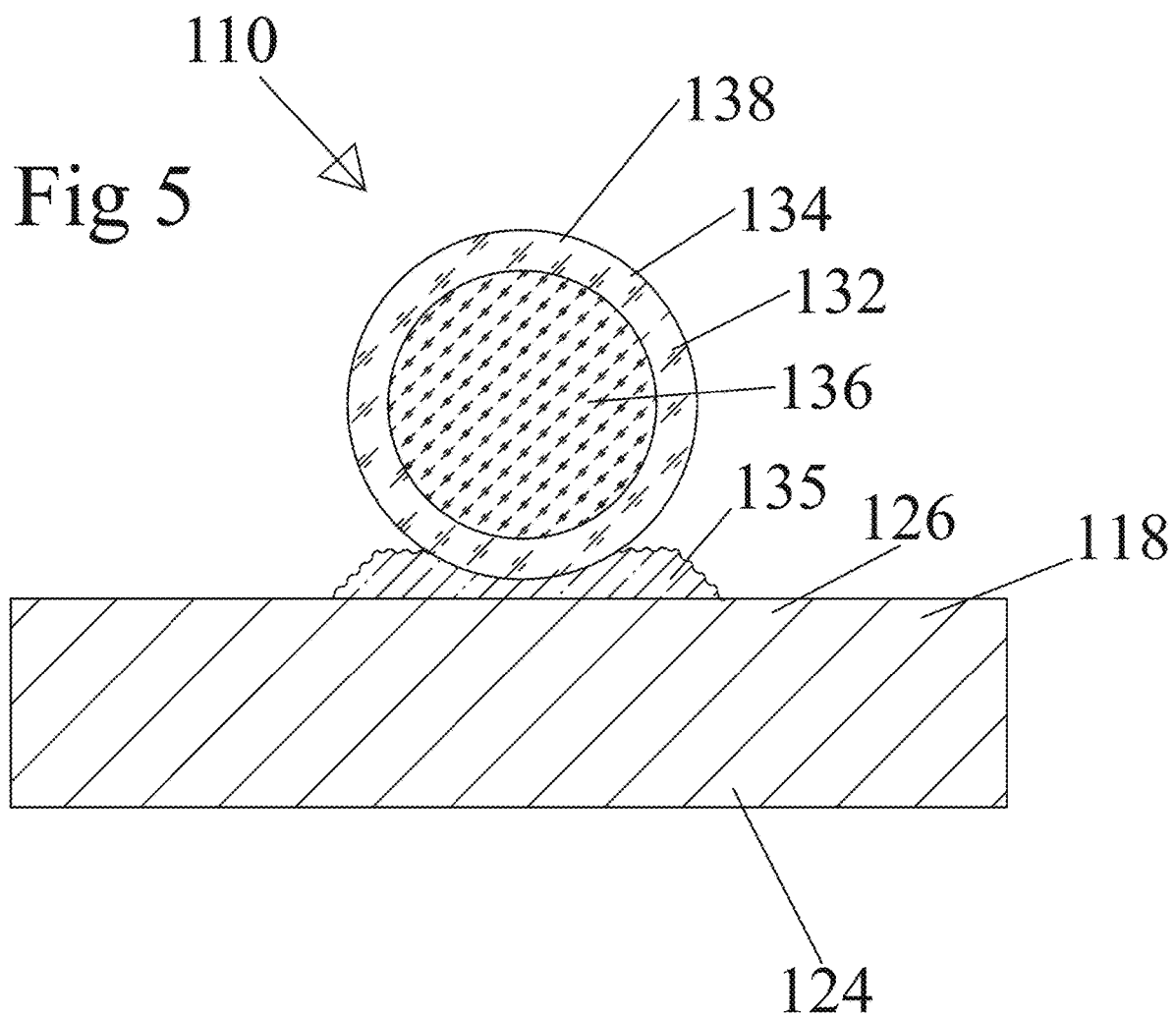
FIG. 5 is a cross-sectional end view of a fiber optic sensor configured in accordance with an embodiment of the present invention.

Referring now to FIGS. 2 and 3, specific aspects of the sensor housing assemblies 106a-106n are presented. As shown in FIG. 2, each of the sensor housing assemblies 106a-106n may include one or more longitudinal strain fiber optic sensors 110, one or more hoop strain fiber optic sensors 112, one or more torsional strain fiber optic sensors 114, and one or more temperature-sensing fiber optic sensors 116. Preferably, a temperature-sensing fiber optic sensor used as a temperature compensation sensor is located in close proximity to associated strain fiber optic sensors, but is isolated from the strain field (e.g., as provided for by the tubular member interface body 118 of the temperature-sensing fiber optic sensor 116 discussed below in reference to FIG. 6).

In preferred embodiments, each one of the fiber optic sensors is integrated into a sensor housing 117 of a respective one of the sensor housing assemblies 106a-106n. Each one of the fiber optic sensors 110-116 has a tubular member interface body 118 that is exposed at an interface surface 119 of the sensor housing 117 that defines a central passage 120 thereof. An exterior surface of the elongated tubular member is engaged with (e.g., bonded to) the tubular member interface body 118. A longitudinal axis of the central passage 120 extends approximately parallel with a longitudinal axis of the elongated tubular member 102. In preferred embodiments, four (4) longitudinal strain fiber optic sensors 110, which are preferably angularly spaced by 90 degrees around the central passage 120 of the sensor housing 117, may be placed within the sensor housing 117 of a respective one of the sensor housing assemblies 106a-106n.

Preferably, the sensor housing 117 is a one-piece structure made from a resilient polymeric material. Examples of such a one-piece structure include, but are not limited to casting structures and molded structures. For allowing the elongated tubular member 102 to be disposed within the central passage 120 of the sensor housing 117, the sensor housing 117 may include a slot 122 or other feature therein for allowing the elongated tubular member 102 to be placed into the central passage 120 and fixedly secured to the sensor housing 117. To this end, the sensor housing is preferably made in a manner (e.g., made from a resilient material) for enabling a width of the slot 122 or configuration of such other feature to be selectively manipulated (e.g., increased by flexure of the sensor housing 117).

Referring to FIGS. 2-6, the tubular member interface body 118 of each one of the fiber optic sensors (110-116) has a tubular member engagement portion 124 that is exposed at the interface surface 119 of the sensor housing 117 and an optical fiber engagement portion 126 that is within the sensor housing 117. This arrangement allows for the sensor housing 117 and thus the tubular member interface bodies 118 thereof to be engaged with an exterior surface of the elongated tubular member 102. In preferred embodiments, the tubular member interface bodies 118 are bonded to the exterior surface of the elongated tubular member 102 by use of a suitable bonding material. Such a suitable bonding material (e.g., a 2-part epoxy resin or the like) will enable temperature and strain exhibited at the exterior surface of the elongated tubular member 102 to be imparted upon the tubular member interface body(ies) 118 thereof with negligible attenuation. Preferably, the tubular member interface bodies 118 are made from a metallic material that has a coefficient of thermal expansion that is substantially the same as a coefficient of thermal expansion of a material from which the elongated tubular member 102 is made and have a thickness oat optimized required structural integrity with respect to transmission of strain and/or heat transfer.

Figure 6:
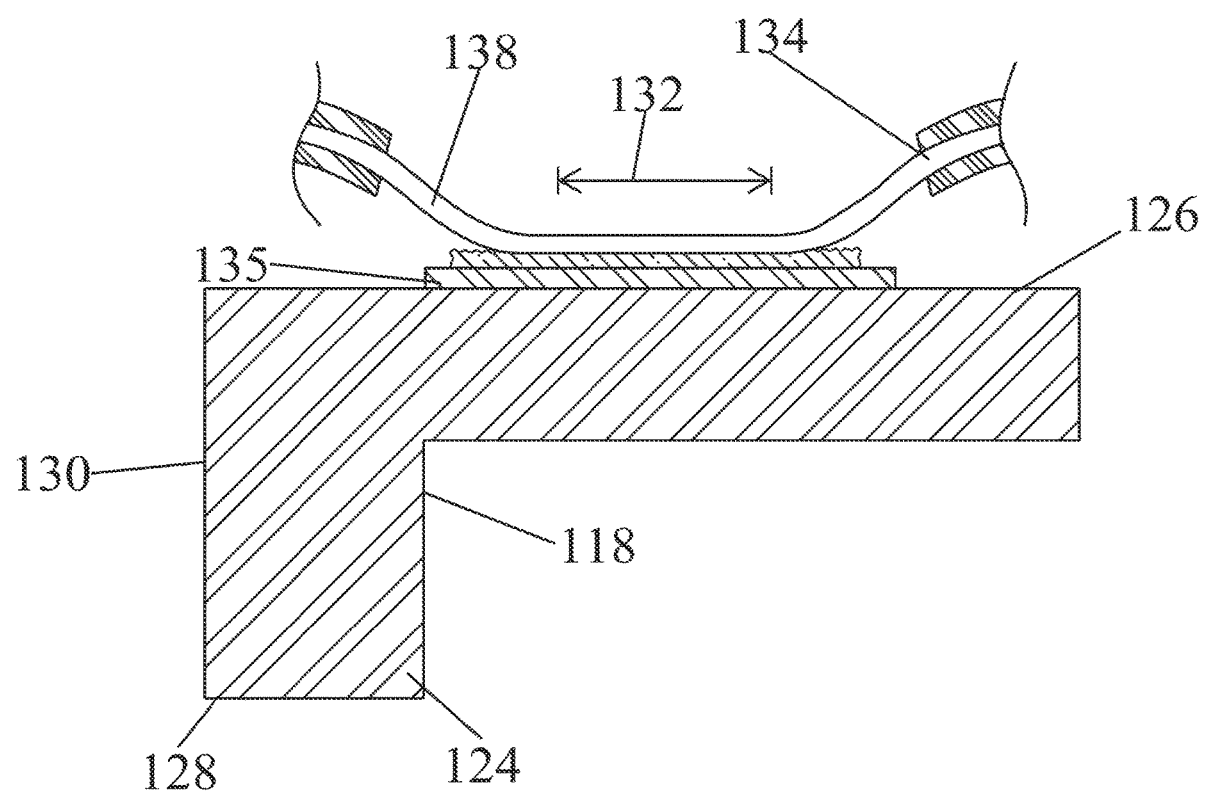
FIG. 6 is a cross-sectional side view of a temperature-indicating fiber optic sensor configured in accordance with an embodiment of the present invention.

As best shown in FIGS. 2-5, each tubular member interface body 118 used for providing strain-specific operating condition information (e.g., of sensors 110-114) preferably has a length that is substantially greater than a width thereof, are orientated with the length direction extending substantially parallel to the direction of the related strain, and have spaced-apart, substantially-parallel opposing major surfaces (i.e., the tubular member engagement portion 124 and the optical fiber engagement portion 126 each define a respective one of the spaced-apart opposing major surfaces). As best shown in FIG. 6, the tubular member interface body 118 used for providing temperature-specific operating condition information (e.g., of sensor 116) is L-shaped and has an end surface 128 and side surface 130 that respectively defining an end face thereof and a side face thereof. The end surface 128 is the tubular member engagement portion 124 and the side surface 130 is the optical fiber engagement portion 126.

As shown in FIGS. 3-6, the optical fiber engagement portion 126 of each tubular member interface body 118 is attached to an optical fiber 134 of the fiberoptic cable 108 at an operating condition signal generating portion 132 thereof. Each tubular member interface body 118 and the attached operating condition signal generating portion 132 of the optical fiber 134 jointly for a respective one of the fiber optic sensor (110-116). Attachment of the optical fiber 134 to the optical fiber engagement portion 126 of the tubular member interface body 118 in combination with the material selection and dimension of the tubular member interface body 118 preferably provides for negligible attenuation of strain events (i.e., expansion-contraction) and thermal events (i.e., temperature change) exhibited at the exterior surface of the elongated tubular member being imparted upon the operating condition signal generating portion 132 of the strain-sensing fiber optic sensors 110-114. To this end, in preferred embodiments, such attachment includes bonding with a suitable bonding material 135 (e.g., a 2-part epoxy resin or the like). Advantageously, fiber optic sensors configured in accordance with embodiments of the present invention involve no penetrations into the elongated tubular member to gain access to operating condition information of a fluid therein. It is disclosed herein that the fiber-optic cable 108 can comprise a plurality of interconnected segments of cable, that the fiberoptic cable 108 can comprise more than one optical fibers, and that the one or more optical fibers of one or more segments of fiber-optic cable can be connected in an end-to-end manner to form a contiguous optical fiber structure.

The optical fiber 134 includes a light transmitting structure 136 (e.g., a cladded core) and a polymeric coating 138 formed directly on the light transmitting structure 136. Polyimide and polyacrylate are examples of such polymeric material. It is disclosed herein that the light transmitting structure 136 (e.g., the core or cladding thereof) can contain Germania and/or Ebrium dopants for signal amplification and can be made of a single mode of silica glass. A signal generating portion of an optical fiber containing such a dopant is an example of being adapted for mitigating signal attenuation resulting from exertion of forces from pressure within a subsea environment.

Advantageously, the applicants herein have discovered that, when the optical fiber 134 has a polyimide coating, the optical fiber can be bonded directly to the optical fiber engagement portion 126 without removal of such polyimide coating. In contrast, when the optical fiber 134 has a polyacrylate coating, the polyacrylate coating is preferably removed from the light transmitting structure 136 of the optical fiber 134 such that the light transmitting structure 136 of the optical fiber 134 can be bonded directly to the optical fiber engagement portion 126. Without wishing to be bound by any particular theory, applicant believes that one or more mechanical/physical properties of the polyimide material provide for negligible attenuation of strain and thermal events exhibited within the exterior surface of the elongated tubular member 102 being communicated to the operating condition signal generating portion 132 of the optical fiber 134. Examples of such mechanical/physical properties of the polyimide material include, but are not limited to, modulus of elasticity, tensile strength, and coefficient of friction.

The operating condition signal generating portion 132 of the optical fiber 134 is within light transmitting structure 136. In preferred embodiments, the optical fiber 134 includes a plurality of operating condition signal generating portions spaced along its length, whereby each one of the fiber optic sensors 110-116 positioned along a length of the elongated tubular member 102 comprises a respective one of the operating condition signal generating portions. Each operating condition signal generating portion 132 of the optical fiber 134 is configured to interact with a respective different wavelength of light that is transmitted along the length of the optical fiber 134 within the light transmitting structure 136 (i.e., transmitted signal). Such interaction generates a corresponding signal (i.e., detected signal) that characterizes a change in the strain and/or temperature exhibited within the operating condition signal generating portion 132 with respect to baseline strain and/or temperature. By assessing the detected signal for a particular one of the fiber optic sensors 110-116, operating condition information of the elongated tubular member 102 and/or a fluid therein at a location of the particular one of the fiber optic sensors 110-116 can be determined such as by a suitably configured algorithm of a data acquisition system.

Figure 7:
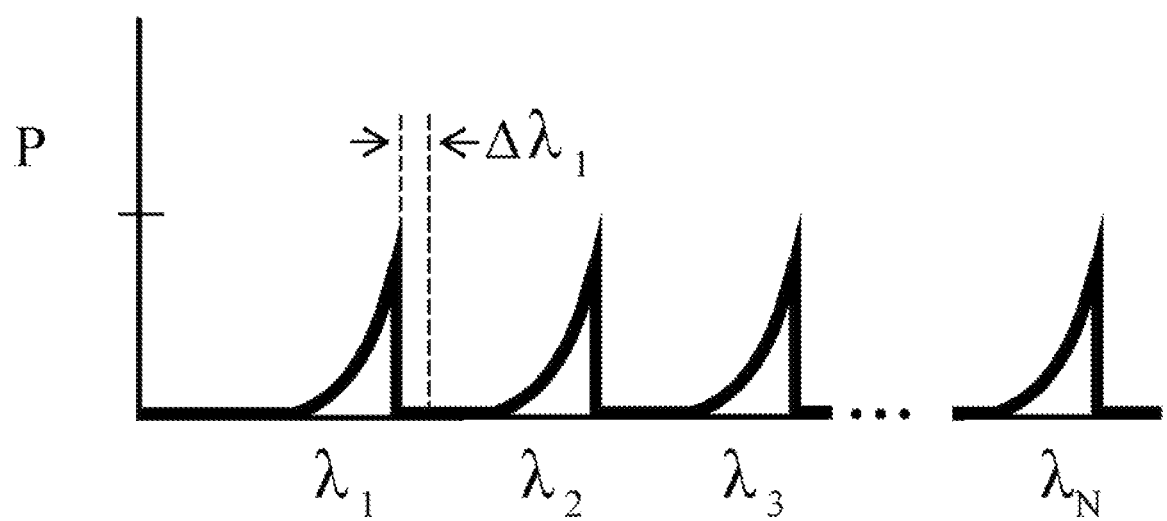
FIG. 7 is a diagrammatic view showing a detected signal in accordance with wavelength division multiplexing for a plurality of fiber optic sensors.

FIG. 7 shows an example of a detected signal in accordance with wavelength division multiplexing for a plurality of fiber optic sensors that each have an operating condition signal generating portion that is responsive to a different wavelength of a transmitted signal (i.e., a pulse of laser light of a known spectrum of wavelength). When the operating condition signal generating portion of each fiber optic sensor is subjected to the transmitted signal, it produces a reflected signal having a power peak 140 at the responsive wavelength thereof for each one of n fiber optic sensors. For example, a data acquisition system configured in accordance with an embodiment of the present invention can claim power greater than 20 dB within an interrogator thereof. The wavelength of the reflected signal for a particular one of the fiber optic sensors shifts higher or lower as a function of changes in length of the operating condition signal generating portion thereof due to expansion and contraction resulting from changes in strain within the elongated tubular member, change in temperature of the elongated tubular member, change in temperature of the operating condition signal generating portion of the optical fiber and/or force exerted on the operating condition signal generating portion of the optical fiber from exposure to hydrostatic pressure from a subsea environment.

Through use of one or more fiber optic sensors that sense changes in strain within the elongated tubular member and at least one adjacent fiber optic sensor that monitors temperature at the location of the elongated tubular member where the strain-sensing fiber optic sensors are located, one or more of the operating conditions can be derived. Such operating conditions include, but are not limited to, strain within a wall of an elongated tubular members, pressure within an interior space of the elongated tubular members, torsion applied to the elongated tubular members, temperature of the wall or surface of the elongated tubular members, temperature of a fluid within the interior space of the elongated tubular members, and flow confirmation of a fluid within the interior space of the elongated tubular members.

Bragg grating, which are well-known to a person of ordinary skill in the art of optical fibers, is a preferred implementation of the operating condition signal generating portion 132 of the optical fiber 134. Wavelength for the Bragg gratings may range from about 1200 to about 1700 nanometers with reflectively thereon being generally greater than about 10% and preferably greater than about 90%. Although Bragg gratings are a preferred implementation of the operating condition signal generating portion 132, it is disclosed herein that other implementations of generating operating condition information are also contemplated herein. By way of example, such other that other implementations of generating operating condition information include, but are not limited to, distributed strain signal generating techniques, Sagano signal generating techniques, Michelson signal generating techniques, and Fabry Pero signal generating techniques. It is also disclosed herein that electrical based sensors such as restive strain gauges, accelerometers, and/or potentiometers may optionally be used (e.g., in combination with fiber optic sensors) for generating operating condition information. Furthermore, it is disclosed herein that optical time domain reflectrometry methods are integrated into the Bragg gratings or other similarly configured operating condition signal generating portion for temperature monitoring.

Figure 8:
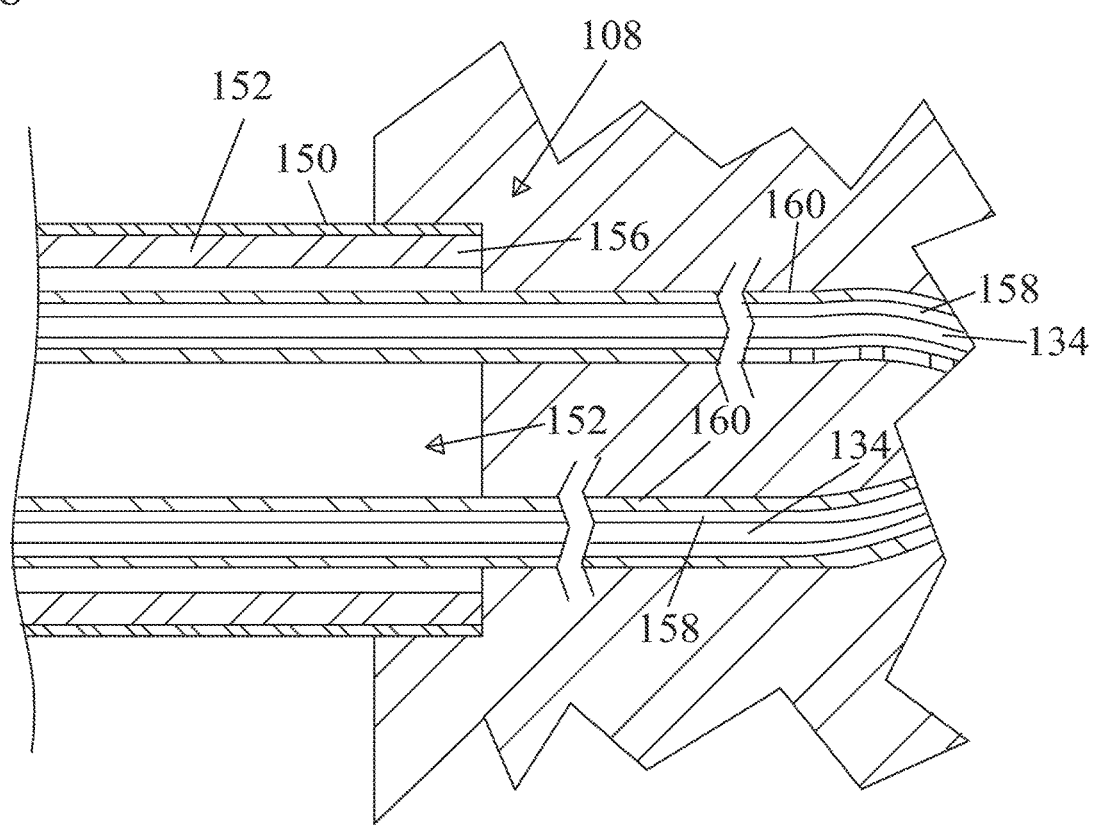
FIG. 8 is a fragmentary cross-sectional view showing a fiberoptic cable configured in accordance with an embodiment of the present invention.

FIG. 8 shows a preferred embodiment of the fiberoptic cable 108. The fiberoptic cable 108 includes an outer jacket 150 formed over a tubular armor layer 152 that is within a central passage 154 of the outer jacket. An end portion 156 of the outer jacket 150 and the tubular armor layer 152 is secured within the sensor housing 117. A plurality of optical fibers 134 extend within the central passage 154. A length of each one of the optical fibers extends beyond the end portion 156 of the outer jacket 150 from within the central passage 154 and into the sensor housing 117. For example, as discussed above in reference to FIGS. 2-6, one or more of the optical fibers 134 has operating condition signal generating portions 132 thereof attached to a respective tubular member interface body 118 for forming the optical fiber sensors 110-116 and, thus, extends beyond the end portion 156 of the outer jacket 150.

Figure 9:
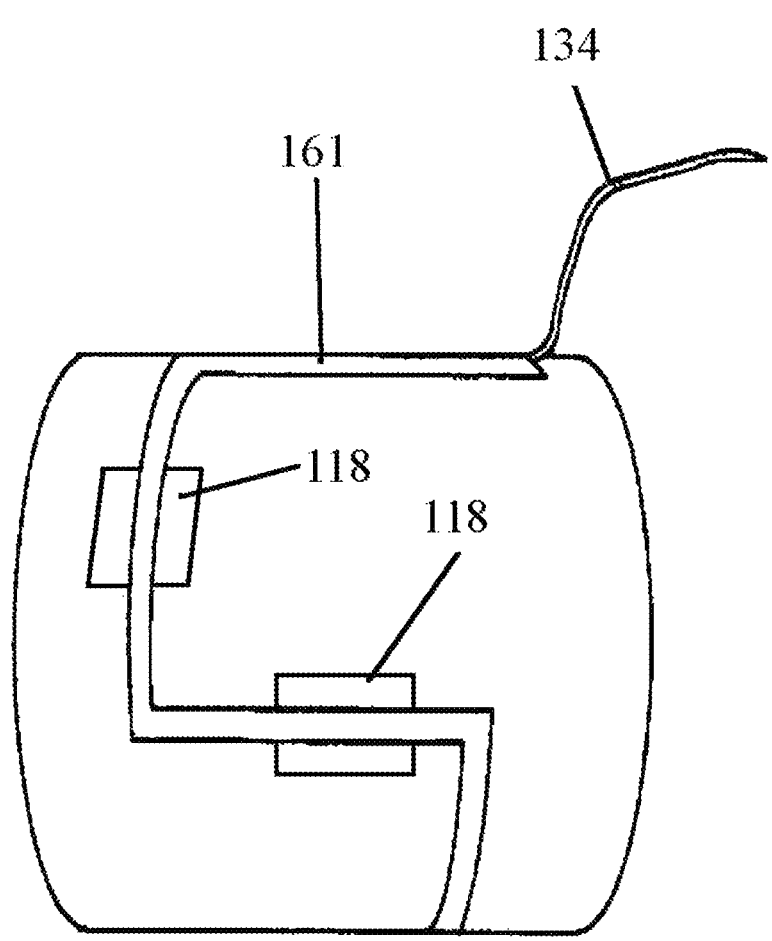
FIG. 9 is a side view showing a length of unjacketed optical fiber extending over an exterior surface of an elongated tubular member and covered by a layer of protective material.

At least a portion of each one of the lengths of the optical fibers that spans between the respective tubular member interface body 118 and the end portion 154 of the outer jacket 150 is disposed within a layer of a viscous material composition 158. The optical fibers 134 can each extend within a respective inner jacket 160. Where the optical fiber 135 extends from the central passage 154 into the sensor housing 117 and is within the inner jacket 160, the viscous material composition 158 is preferably within the inner jacket 160. When the optical fiber 134 extends beyond an end portion of inner jacket 160 and/or there is no inner jacket (i.e., unjacketed optical fiber), a layer of the viscous material composition 158 may be provided onto the optical fiber 134 such as, for example, where it spans over the elongated tubular member 102. For example, as shown in FIG. 9, a length of unjacketed optical fiber 134 extends over the exterior surface of the elongated tubular member 102 and is covered by a layer of protective material 161 (e.g., a layer of polymeric material such as polyurethane). In such case, the length of unjacketed optical fiber 134 is preferably disposed within a layer of the viscous material composition 158.

In applications where the optical fiber is without protection of the tubular armor layer 152 and is subjected to pressure from use in a subsea environment, the applicant has discovered that disposing the optical fiber 132 within a layer of viscous material composition is advantageous. Without wishing to be bound to any specific theory, applicant believes that the layer of viscous material serves as a hydrostatic support that aids in mitigating non-uniform cross-sectional compression of the optical fiber and that aids in limiting the occurrence of 'microbends' resulting from the optical fiber being forced against small-radius/sharp discontinuities with mating surfaces of the sensor housing 117 or elongated tubular member 102.

The viscous material composition preferably exhibits a relatively uniform level of viscosity across a wide range of temperatures. For example, in a preferred embodiment, the viscous material composition is a grease that has an oil viscosity index of not less than about 120, a temperature range having an upper limit of at least about 200° C., and an oil viscosity of at least about 3.0 at 200° C. Examples of a grease (i.e., a viscous material composition) exhibiting such thermal viscosity stability are commercially-available from E. I. du Pont de Nemours and Company under the tradename and grades of KRYTOX GPL 205(H-1), KRYTOX GPL 206(H-1), KRYTOX GPL 207, KRYTOX GPL 216, KRYTOX GPL 217, KRYTOX GPL 250AC, and KRYTOX GPL280AC.

Applicant has discovered that exposure of optical fibers to pressure of a subsea environment can result in attenuation of a reflected signal within an optical fiber. It is theorized that such attenuation can be due to cross-sectional distortion of the optical fiber such as, for example, resulting from impingement of the optical fiber upon discontinuities that create microbends in the optical fiber, from compression of the optical fiber against otherwise flat, sufficiently rigid surfaces, and the like. The result is a reduction in signal power and distortion of the signal profile, both of which can be detrimental to accurate assessment of operating condition information. As discussed above, the use of a viscous material composition can aid in mitigating such attenuation. Optionally or additionally to use of such viscous material composition, the operating condition signal generating portions of an optical fiber (e.g., a light reflecting grating thereof) can be adapted to at least partially mitigate signal attenuation caused by force exerted on the optical fiber by the subsea environment. For example, the operating condition signal generating portions of the optical fiber can be formed such that the light reflecting grating thereof is configured to provide a designated Bragg condition exhibited at an environmental pressure of one atmosphere when the optical fiber is subjected to a pressure exerted thereon by the subsea environment. In preferred embodiments, the environmental pressure corresponds to a subsea depth between about 1000 feet and about 5000 feet. Alternatively, or additionally, the operating condition signal generating portions of the optical fiber can be formed such that the light reflecting grating is adapted to produce a signal having a peak amplitude that is at least about 50 dB and preferably not less than about 10 dB when in an environmental condition of 1 atmosphere.

In a preferred embodiment, the signal generating portion of an optical fiber is adapted to at least partially mitigating the signal attenuation effect resulting from forces exerted on the optical fiber (e.g., including the signal generating portion thereof) by a subsea environment. In such an embodiment, a light reflecting grating within the optical fiber (i.e., the signal generating portion of the optical fiber) is located a subsea depth between 1000 feet and 5000 feet. The signal generating portion of the optical fiber being adapted to at least partially mitigate signal attenuation includes the light reflecting grating being adapted to produce a signal having a peak power amplitude that is approximately equal to that in an environmental condition of 1 atmosphere when subjected to the pressure exerted thereon by the subsea environment As discussed above, use of fiber optic sensors in accordance with embodiments of the present invention within a subsea environment can result in attenuation of a reflected signal within an optical fiber used to communication signals to and from such fiber optic sensors. This attenuation is an example of environment-induced signal degradation. To further mitigate such environment-induced signal degradation, apparatuses and systems configured in accordance with embodiments of the present invention can be calibrated to account for the environmental effects (e.g., a subsea environment) and normalize optical fiber sensor signal of each one of a plurality of such sensors based on its respective location within the subsea environment.

In an embodiment of the present invention, such calibration comprises a plurality of steps. A step is performed for deploying an elongated tubular member in a subsea environment. The elongated tubular member has mounted thereon one or more fiber optic sensors that are each adapted for generating a respective form of operating condition information. In this respect, each one of the fiber optic sensors, which can be configured in the manner discussed above with respect to FIGS. 2-6, is an operating condition sensor. A step is performed for causing an operating condition information signal to be transmitted from the fiber optic sensors to a data acquisition system (which can serve as a calibration apparatus) via one or more optical fibers of a fiberoptic cable. As discussed above, the operating condition information signal can be generated by an operating condition signal generating portion of the one or more optical fibers in response to being exposed to a transmitted signal of a given wavelength bandwidth.

In response to the data acquisition system receiving the operating condition information signal, a step is performed for determining an amount of attenuation of the operating condition information signal with respect to a non-subsea environment. An environment comprising an atmosphere of air at a pressure of 1 atmosphere is an example of the non-subsea environment. In response to determining the amount of attenuation, a step is performed for calibrating signal processing functionality of the data acquisition system as a function of the attenuation of the operating condition information signal with respect to the non-subsea environment. For example, in a preferred embodiment, such calibration offsets at least a portion of the attenuation caused by force exerted on the one or more optical fibers by pressure within the subsea environment. Offsetting at least a portion of the attenuation caused by force exerted on the one or more optical fibers by pressure within the subsea environment can include, for example, offsetting wavelength shift in a signal from the at least one operating condition sensor within the subsea environment as a function of a baseline signal generated by the operating condition sensor at atmospheric (i.e., baseline) conditions and can include, for example, offsetting reflectivity (e.g., peak reflectivity) in a signal from the at least one operating condition sensor within the subsea environment as a function of a baseline signal generated by the operating condition sensor at atmospheric (i.e., baseline) conditions.

Temperature and pressure are examples of such atmospheric conditions. Such offsetting of the wavelength shift can include, for example, determining wavelength shift in at least one of an axial direction of the elongated tubular member and a hoop direction of the elongated tubular member, offsetting the wavelength shift as a function of a differential between a baseline temperature and a temperature of the subsea environment at a location of the operating condition sensor. Such offsetting of reflectivity can include, for example, determining a power peak ratio between the atmospheric and subsea environments (e.g., as a function of subsea depth and/or temperature) and setting a maximum power peak (i.e., reference or baseline power peak) at a designated subsea depth based upon such power peak ratio. Signal processing functionality in accordance with embodiments of the present invention include, but is not limited to, using a shift in a baseline (i.e., reference) wavelength reflected by a particular operating condition sensor to determine strain exerted on the particular operating condition sensor (i.e., the operating condition signal generating portion thereof).

It is disclosed herein that power peak of a signal from an operating condition sensor (i.e., a fiber optic sensor) decreases with increasing subsea depth at which the operating condition sensor is located. For example, the power peak at a first depth is 90% that at atmospheric conditions, is 75% at a second depth that is greater than the first depth, and is 50% at a third depth that is greater than the second depth. Calibration of power peak of a particular operating condition sensor as a function of depth serves to offset the power peak of the particular operating condition sensor to account for signal mitigation thereof at the subsea depth of the particular operating condition sensor. A power peak of about 50 decibels (dB) is preferred but can optionally be as low as 10 (dB).

It is disclosed herein that signal power can be affected by a plurality of variables. Examples of such variables include, but are not necessarily limited to, input power (i.e., laser light output into the optical fiber), distance to a particular fiber optic sensor from the point of laser light, reflectivity of an operating condition signal generating portion of the optical fiber (e.g., a light reflecting grating thereof), and signal attenuation of the optical fiber. In typical embodiments, input power, distance and glass attenuation are fixed for a particular fiber optic sensor. Thus, reflectivity is the primary variable that is subject to effect of pressure and/or temperature associated with the sensor being located at a respective subsea depth. The operating condition signal generating portion of the optical fiber exhibits physical (e.g., dimensional) change from forces associated with pressure in a subsea environment. A change in cross-sectional shape from round to oval/elliptical (e.g., at or away from an operating condition signal generating portion of the optical fiber) due to force from subsea pressure exerted on the optical fiber is an example of such physical change. The physical change contributes or results in wavelength shift and/or power peak degradation.

In a preferred embodiment of the present invention, the data acquisition system is adapted to receive a signal comprising operating condition information from a plurality of fiber optic sensors. The data acquisition system, which can comprise an optical sensing module and/or a multiplexing unit with a time division multiplexing module, is adapted to utilize WDM to derive information for a plurality of operating conditions using information received from the plurality of fiber optic sensors. One example of such operating condition information is strain within the exterior wall of the elongated tubular member as a function of a signal wavelength generated by the operating condition signal generating portion of a first one of the fiber optic sensors. Another example of such operating condition information is pressure of a fluid within the central passage of the elongated tubular member as a function of a signal wavelength generated by the operating condition signal generating portion of a second one of the fiber optic sensors. Yet another example of such operating condition information is temperature of the fluid within the central passage of the elongated tubular member as a function of a signal wavelength generated by the operating condition signal generating portion of a third one of the fiber optic sensors.

Figure 10:
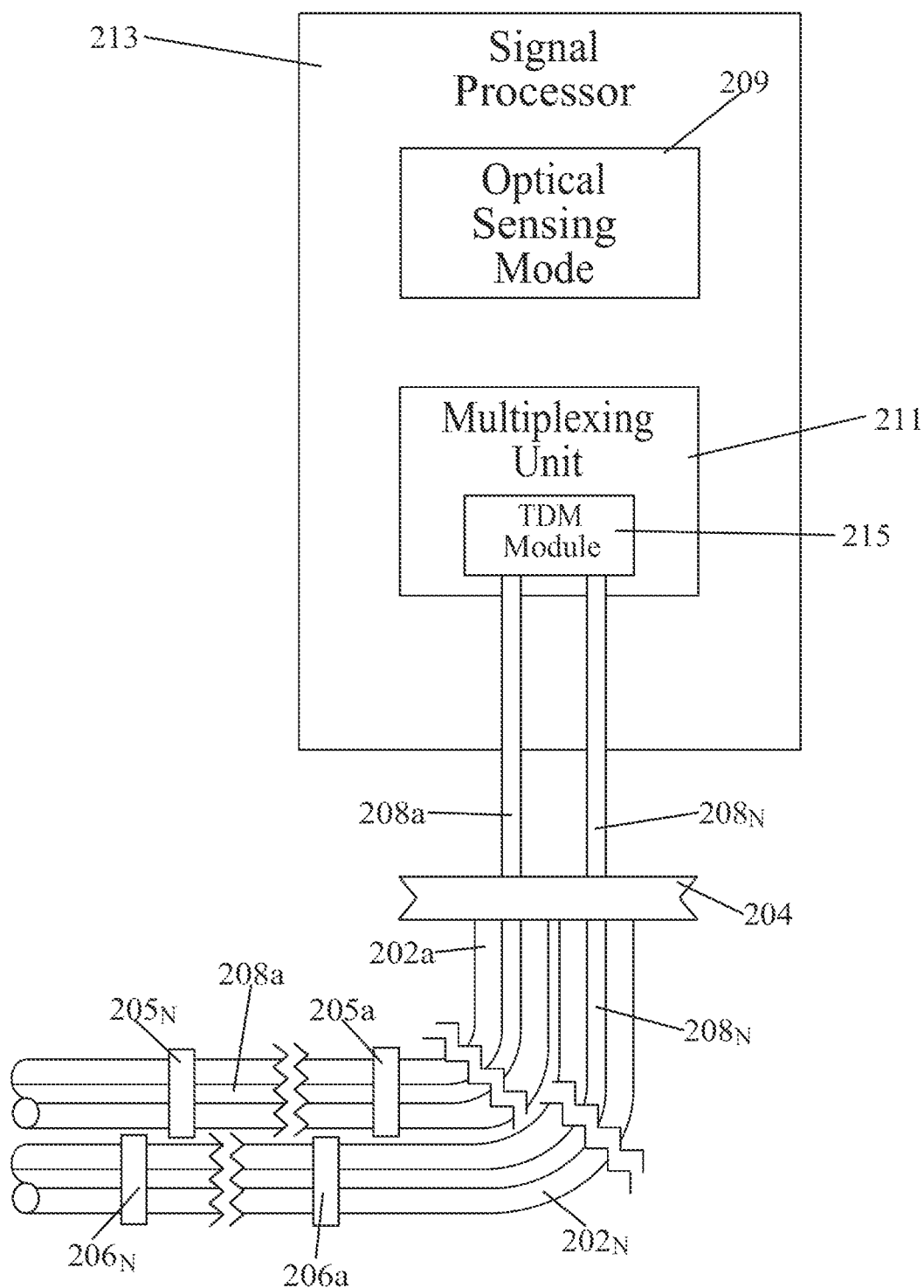
FIG. 10 is a multi-tubular member operating condition monitoring apparatus configured in accordance with an embodiment of the present invention.

Referring now to FIG. 10, a multi-tubular member monitoring apparatus 200 configured in accordance with an embodiment of the present invention is shown. The multi-tubular member monitoring apparatus 200 includes a plurality of elongated tubular member 202 that are connected to a support structure 204. A plurality of sensor housing assemblies 205a-205n, 206a-206n are mounted in a spaced-apart arrangement along a length of a respective one of the elongated tubular members 202a-202n. The sensor housing assemblies 205a-205n, 206a-206n and the fiber optic sensors thereof provide the same or similar functionality as the sensor housing assemblies and the fiber optic sensors discussed above in reference to FIGS. 1-6.

The sensor housing assemblies 205a-205n of a first one of the elongated tubular members 202a by a first optical cable 208a and the sensor housing assemblies 206a-206n of an n-th one of the elongated tubular members 202n are connected to each other by an n-th optical cable 208b. The plurality of fiberoptic cables 1-n are connected to a multiplexing unit (MUX) 211 of a signal processor 213 for enabling signals generated by the sensor housing assemblies 205a-205n, 206a-206n to be provided to the signal processor 213. The MUX 211 is connected to an optical sensing module 209 and includes a Time Division Multiplexing (TDM) module 215. The optical sensing module 209 of FIG. 10, as well as the optical sensing module 107 of FIG. 1, can provide signal processing functionality and calibration functionality, as discussed above.

Figure 11:
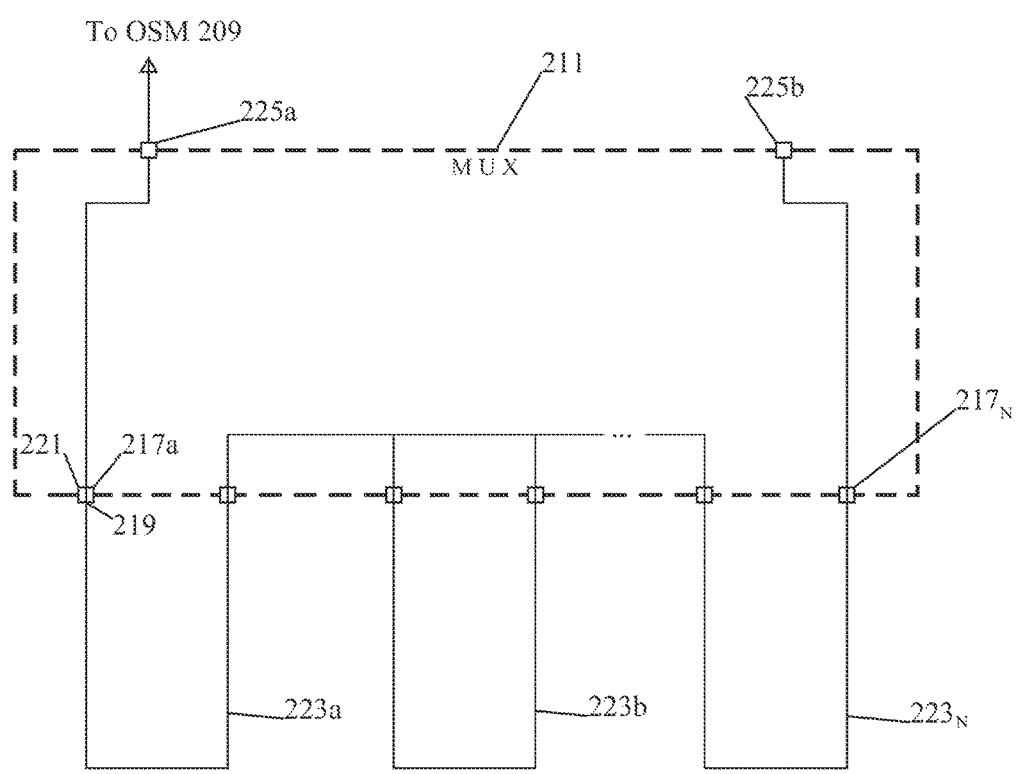
FIG. 11 is a diagrammatic view showing a multiplexing unit providing for signaling via a first end of a contiguous optical fiber structure.

Referring to FIG. 11, the MUX 211 includes a plurality of optical fiber interfaces 217a-217n each having a downstream facing port 219 and an upstream facing port 221. The upstream facing port 219 of each one of the optical fiber interfaces 217a-217n is connectable to each other one of the upstream facing ports 219 for allowing each end of each one of a plurality of optical fibers 223a-223n of one or more fiberoptic cables (e.g., the fiberoptic cables 208a-208n) to be operably connected to the downstream facing port of a respective one of the optical fiber interfaces 217a-217n such that at least two of the optical fibers are connected to each in a series fashion to form a contiguous optical fiber structure having opposing ends. For example, as shown in FIG. 11, the contiguous optical fiber structure comprises the plurality of optical fibers 223a-223n. The upstream facing port connected to an end of the contiguous optical fiber structure is connected to a first signaling port of the optical sensing module 209 via a first signaling port 225a of the MUX 211 for enabling sensor data generated within the contiguous optical fiber structure to be provided from the MUX 211 to the optical sensing module 209.

As shown in FIG. 11, signaling is performed in a conventional manner, which is via a first one of the ends of the contiguous optical fiber structure. Advantageously, however, the MUX 211 and, optionally, the TDM module 215 of the MUX 211 also allow multiple configurations of signal being provided from the first and second fiber optic cables 208, 209 to the optical sensing module 209 in the case where one or more discontinuities occur within the contiguous optical fiber structure.

Figure 12:
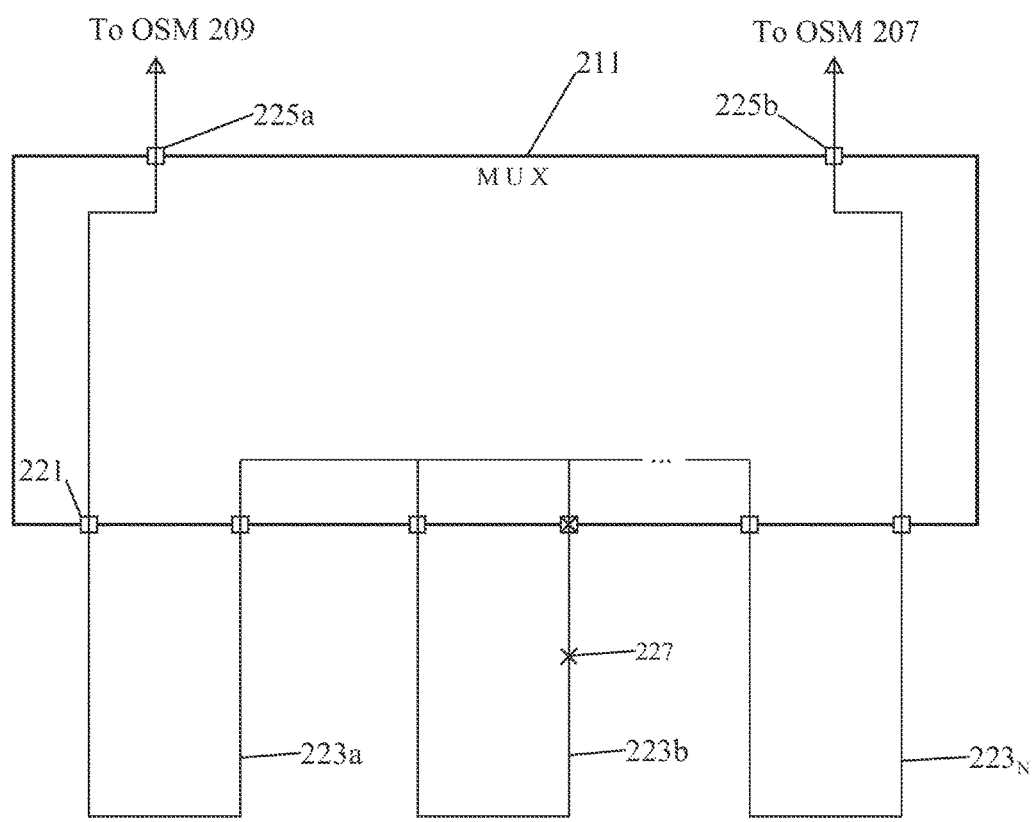
FIG. 12 is a diagrammatic view showing the multiplexing unit of FIG. 11 providing for signaling via both first and second ends of the contiguous optical fiber structure when a discontinuity is detected therein.

As shown in FIG. 12, when a discontinuity 227 occur within a particular one or more of the one optical fibers 223a-223n of the contiguous optical fiber structure (e.g., optical fiber 223b), the MUX 211 may be adapted to implement an operating condition signal to be provided at both of the opposing ends of the contiguous optical fiber structure and monitoring a respective operating condition signal at both of the ends of the contiguous optical fiber structure. For example, in a preferred implementation of the operating condition signal being provided at both of the opposing ends of the contiguous optical fiber structure and monitoring the respective operating condition signal at both of such ends, a first operating condition signal provided via at a first end of the contiguous optical fiber structure and a second operating condition signal provided via at a second end of the contiguous optical fiber structure is monitored by the optical sensing module 209. The TDM module 215 of the MUX 211 can be used for enabling monitoring of the first operating condition signal provided via at the first end of the contiguous optical fiber structure and the second operating condition signal provided via at the second end of the contiguous optical fiber structure via a single signaling port of the optical sensing module 209.

Figure 13:
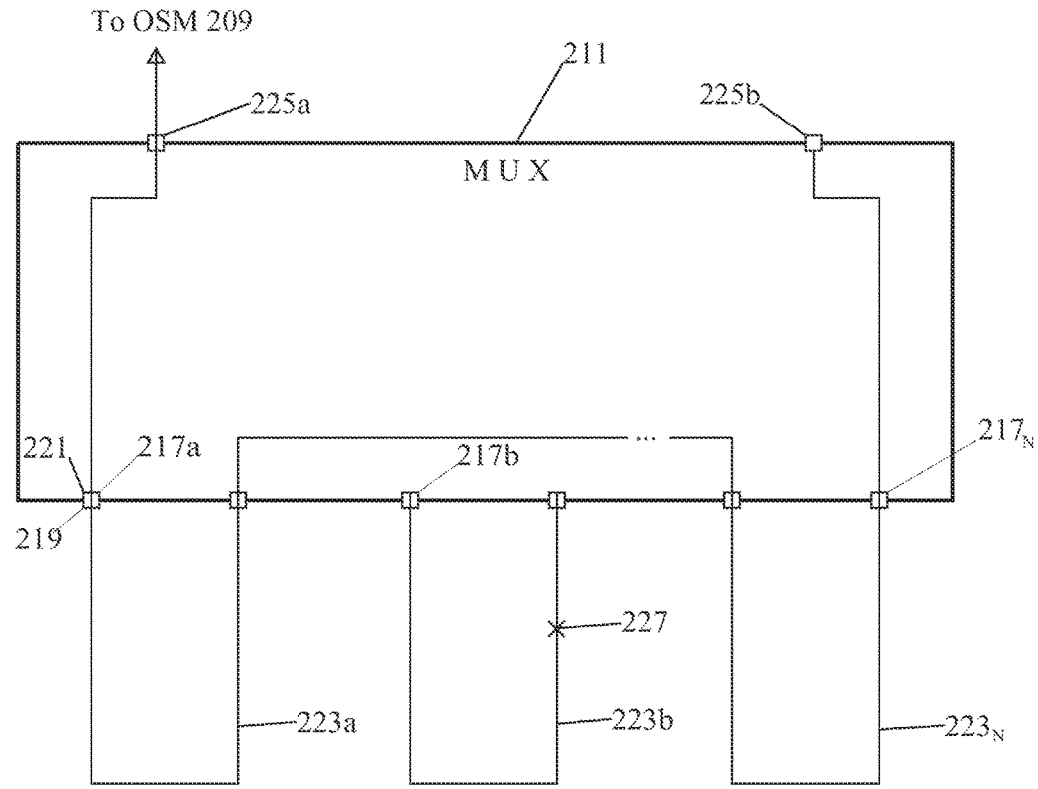
FIG. 13 is a diagrammatic view showing the multiplexing unit of FIG. 11 providing for reconfiguration of constituent lengths of optical fiber of the contiguous optical fiber structure when a discontinuity is detected therein.

Alternatively, as shown in FIG. 13, when the discontinuity 227 occurs within the particular one or more of the optical fibers 223a-223n of the contiguous optical fiber structure (e.g., optical fiber 223b), the MUX 211 may be adapted to implement excluding (e.g., bypass) the particular one or more of the optical fibers 223a-223n from within the contiguous optical fiber structure to create a reconfigured version of the contiguous optical fiber structure and continuing to monitor the operating condition signal provided at the first end of the contiguous optical fiber structure (i.e., via the first signaling port 225a of the MUX). It is disclosed herein that the abovementioned functionalities of the MUX 211 may be implemented manually and/or in an automated manner using optical switches and/or physical couplings. For example, in a preferred implementation of the particular one or more of the optical fibers 223a-223n being excluded from within the contiguous optical fiber structure, detaching the particular one or more of the optical fibers 223a-223n can include detaching first and second ends of the particular one or more of the optical fibers 223a-223n from a corresponding end of adjacent ones of the optical fibers 223a-223n and connecting together the corresponding ends of the adjacent ones of optical fibers 223a-223n.

Figure 14:
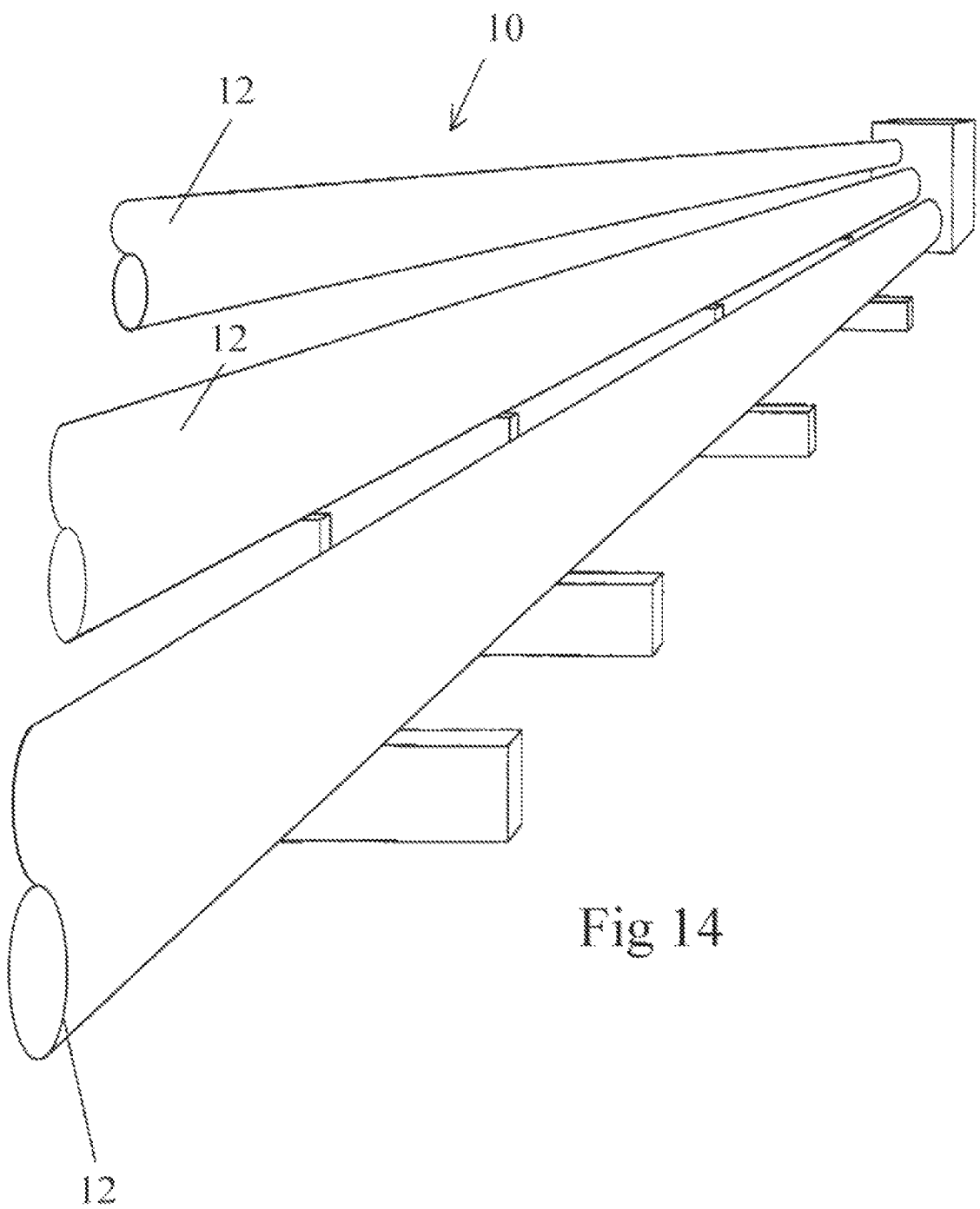
FIG. 14 is a perspective view of a typical pipeline, before deployment in a subsea environment.
Figure 15:
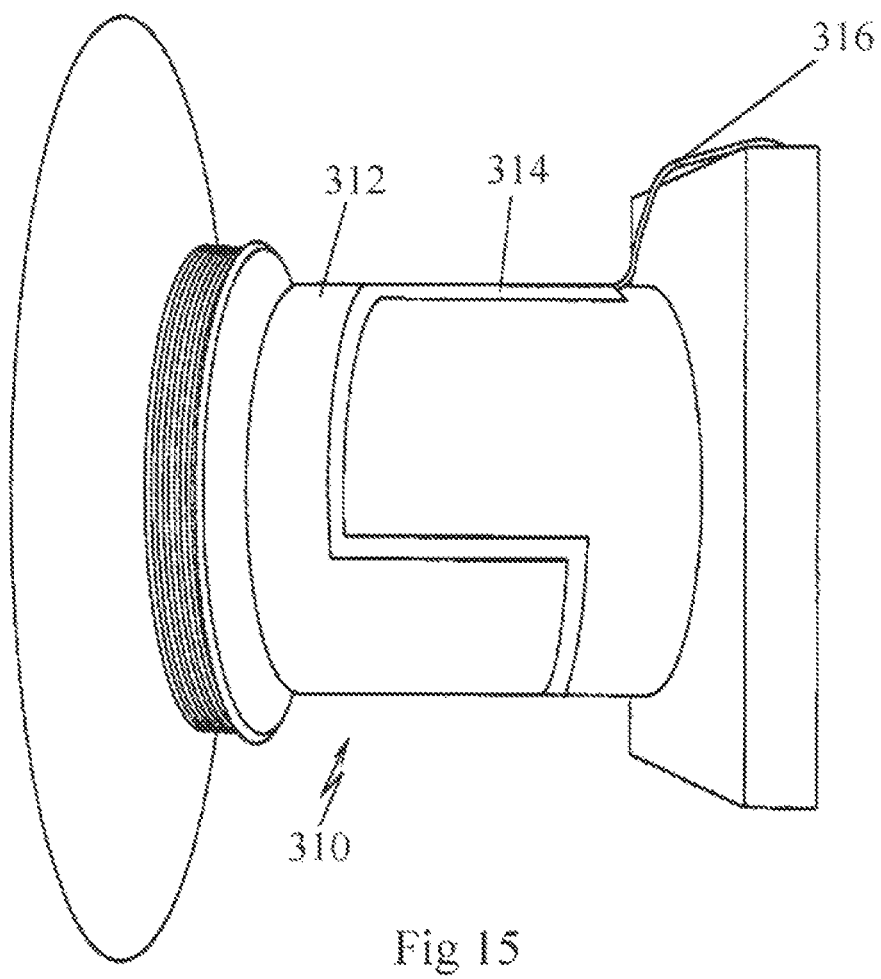
FIG. 15 is a side view showing fiber optic sensors as applied to the exterior wall of the pipeline.
Figure 16:
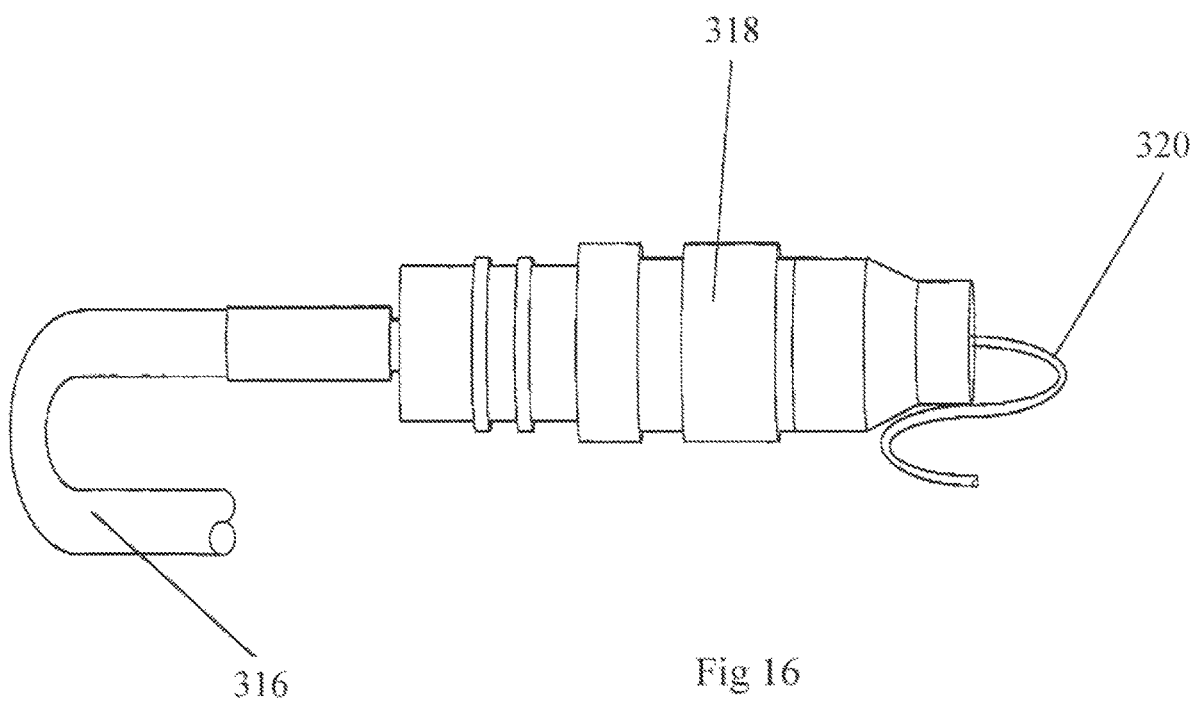
FIG. 16 is a side view showing a collector for collecting the data from a plurality of sensors attached to the pipeline.
Figure 17:
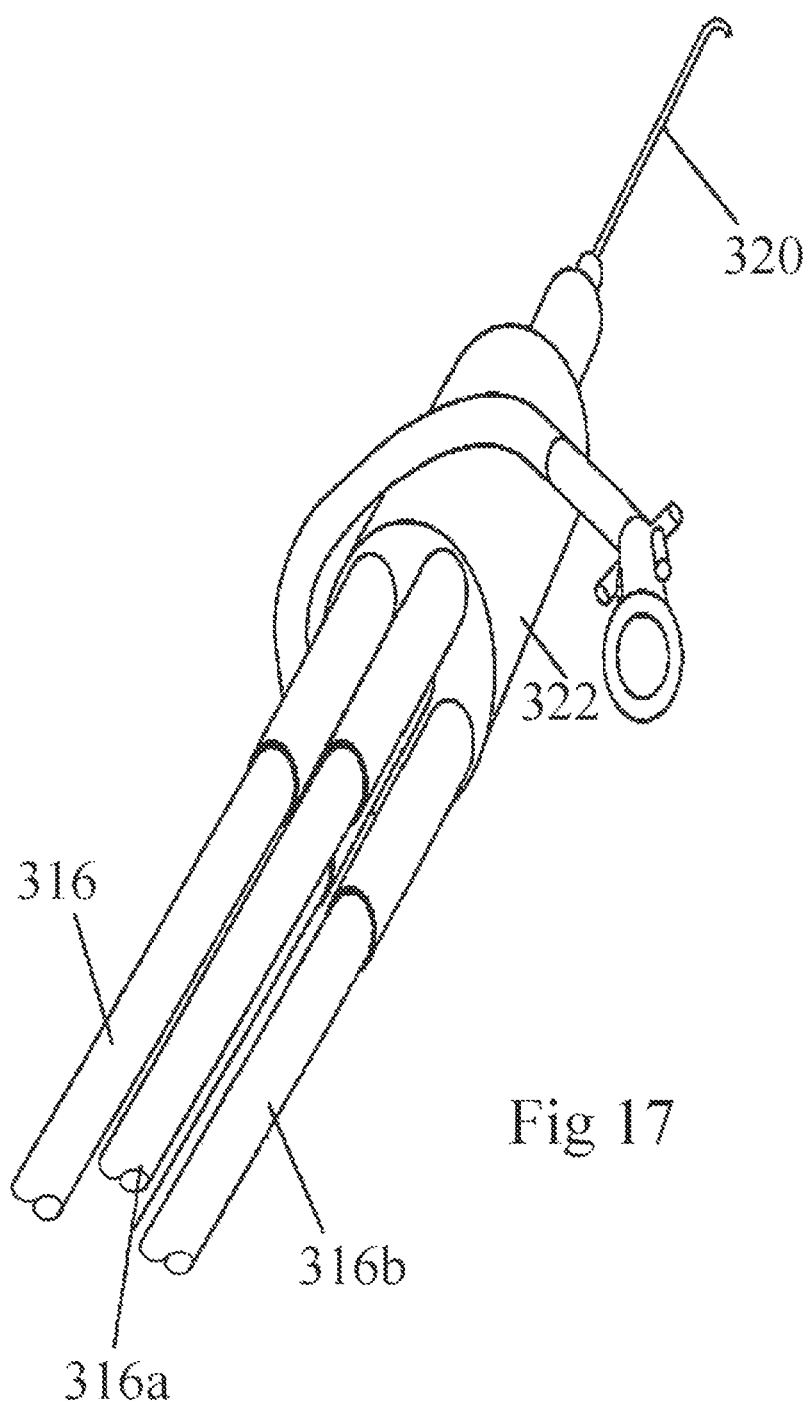
FIG. 17 is a perspective view showing an alternative collector for collecting the data from a plurality of sensors attached to the pipeline.

It is disclosed herein that the above-mentioned MUX functionalities can be implemented in response to a signal assessment process. The signal assessment process may begin with monitoring an operating condition signal provided at one of the ends of the contiguous optical fiber structure to determine operating condition information generated by the operating condition sensors thereof, followed by detecting loss of operating condition information corresponding to at least one of the individual lengths of optical fiber. In response to detecting the loss of operating condition information, the signal assessment process causes reconfiguration of the monitoring of the operating condition signal in accordance with at least one of the above-mentioned MUX functionalities FIGS. 14-17 shown a pipeline system having aspects configured in accordance with one or more embodiments of the present invention. As shown in FIG. 14, a typical pipeline 310 is positioned for deployment in a subsea environment. As discussed above, the fiber optic sensors are attached directly to the outer wall 312 by an epoxy 14, as shown in FIG. 15. The data collected by a sensor array is then conducted to a fiber breakout assembly or collector 318 via the fiber optic cable 316, which is attached to the sensors in the array, as disclosed in FIG. 16. The collected data is then conducted to a topside control room (not shown) via the conductor 320. An alternative collector 322 is shown in FIG. 17, wherein a plurality of sensor array cables 316 may be connected to a single collector 322 for transmitting the collected data to the topside control room via cable 320.

The cabling, connectors, breakout assemblies and support hardware are designed to provide ruggedness during installation and provide attenuation free light transfer. The system is designed for long service life and has measure incorporated to minimize any light transmittal issues such as fiber darkening from hydrogen infusion. Since there are various local measurement locations along the pipeline fiber breakout assemblies incorporated into the invention. Additionally, there is a combination of fiber optic measurements that are integrated into the system.

Preferably, the system contains a multiple of fiber Bragg grating arrays deployed subsea along the pipeline. All tubing is stainless steel. Where desired, Kevlar jackets may be employed.

The time of flight for the light signal is incorporated in the topside monitoring system in the control room.

Attenuation mitigation is used by the use of a pressure balancing material applied to the fiber optic strands in the fiber optic cables. Preferably, the fiber optic cables are coated with a polyurethane, nylon, or polyethylene coating. Polyurethane and epoxy housings are used on top of the sensor stations.

The subsea sensors use hoop displacement of the pipeline the pipeline to determine product pressure from the exterior of the pipeline. No penetrations into the pipeline are necessary to gain access to the flow stream measurements. The connections are designed with a small, angled ferrule to minimize back reflections.

Fiber bundles are multi-fused (more than one fusion splice) in each breakout assembly to reduce space requirements.

Figure 18:
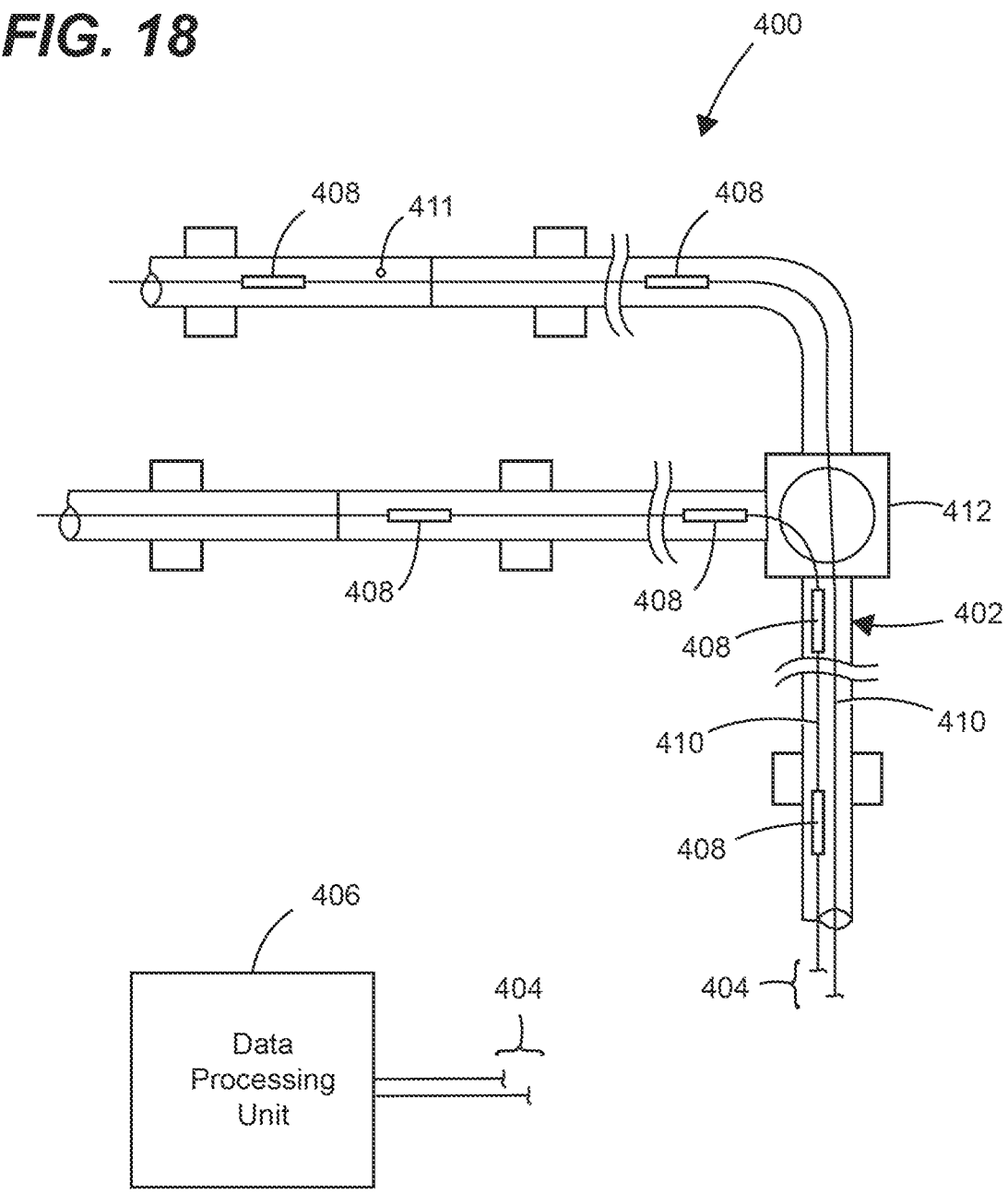
FIG. 18 shows an embodiment of a pipeline system configured in accordance with an embodiment of the present invention.

Turning now to FIG. 18, an embodiment of a pipeline system 400 configured in accordance with an embodiment of the present invention is shown. The pipeline system 400 includes a pipeline 402, a sensor assembly 404 and a data processing unit 406. The sensor assembly 404 generates signals that characterize operating conditions of the pipeline 402 and/or fluid flowing through the pipeline 402. The sensor assembly 404 provides for such operating condition characterizing signal to be transmitted to the data processing unit 406. The data processing unit 406 processes the signals provided thereto by the sensor assembly 404 to enable assessment of such operation conditions and resultant action in response to such operating conditions.

The sensor assembly 404 includes a plurality of sensors 408 that are each attached to a respective one of one or more cables 410. The sensors 408 are mounted on or otherwise attached to the pipeline 402 at spaced apart locations along a length of the pipeline 402. In preferred embodiments, the sensors are fiber optic sensors having a structure and function such as that discussed above in reference to FIGS. 2-7. As discussed above, such sensors can each output a signal that quantitatively characterizes a level of longitudinal strain in a wall of the respective one of the plurality of tubular members and, a level of hoop strain in the wall of the respective one of the plurality of tubular members, both, or a combination thereof. In view of the disclosure made herein, a skilled person will appreciate implementation of other types and configurations of sensor that can be utilized in accordance with embodiments of the present invention.

The data processing unit 406 processes information generated by the sensors 408. For example, in preferred embodiments, the data processing unit can be an optical sensing module, as discussed above in reference to FIG. 1, or can be a signal processor, as discussed above in reference to FIG. 10. In some embodiments, the data processing unit 406 is attached to the sensors 408 directly through the one of more cables 410. Alternatively, the data processing unit 406 can be remotely located from the pipeline 402 and receive information generated by the sensors 408 indirectly. For example, a signal transmitting unit (not shown) can be connected to the sensors 408 local to the pipeline 402 and transmit information generated by the sensors 408 to the remotely located data processing unit 406 in a wired or wireless manner.

The pipeline 402 can include a plurality of pipeline segments. Segments of the pipeline 402 can include branches or legs of the pipeline that are interconnected through, for example, a valve 412 or other type of junction through which fluid that flows through the pipeline can be distributed and/or controlled. Such segments can also include a plurality of discrete lengths of pipeline sections that are attached in an end-to-end manner whereby the pipeline 402 extends over a given distance and/or area.

The pipeline system 400 can be land-based, subsea-based or a combination thereof. For example, in one embodiment, none of the pipeline 402 is located within a subsea environment (i.e., land-based). The pipeline system 400 can be subsea-based, whereby at least a portion of the pipeline 402 and all or a portion of the sensors 408 are located within a subsea environment (e.g., as discussed above in reference to FIGS. 1 and 10). In view of the disclosures made herein, a skilled person will appreciate that embodiments of the present invention are not limited to any particular type or configuration of environment, application or installation.

Figure 19:
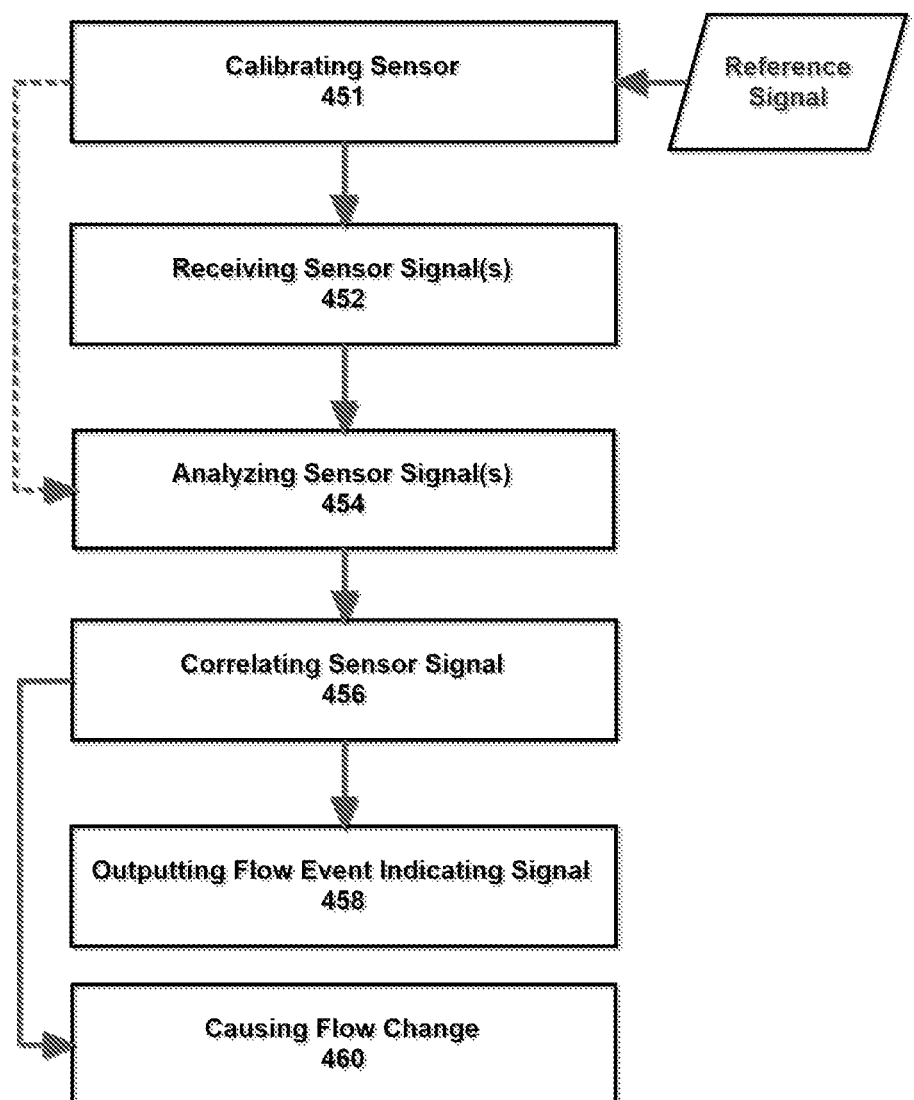
FIG. 19 shows a method 500 of implementing management of operating conditions in accordance with an embodiment of the present invention.

FIG. 19 shows a method 450 of implementing management of operating conditions in accordance with an embodiment of the present invention. The method 450 is specifically configured for detecting operating conditions in a pipeline that are indicative of one or more adverse flow events and, optionally, enabling implementation of corrective (i.e., resultant) actions to change, mitigate or bring attention to such operating conditions. Examples of such adverse flow events include, but are not limited to pipeline clogs, pipeline breaches, pipeline tampering, and the like. In some embodiments, such adverse pipeline operating conditions are indicative of activities associated with theft of product from the pipeline.

In preferred embodiments, as discussed above in reference to FIGS. 1-13, such implementation of detection of operating conditions that are indicative of one or more adverse flow events utilize fiber optic sensors for monitoring vibrations and other signals in elongated tubular members making up segments of a pipeline. To this end, such fiber optic sensors can be strategically placed at a plurality of locations along a length of each elongated tubular member (e.g., every 1000 feet to every half mile) thereby allowing monitoring of critical operating conditions such as strain, temperature and pressure of the elongated tubular member and/or a fluid therein, as well as vibrations and other signals (e.g., frequency responses) indicative of adverse product flow conditions and pipeline operating conditions.

As shown, the method 450 includes a plurality of operations that can be implemented as a non-transitory computer readable medium executed by one or more data processing devices of a computer or other type of data processor based apparatus. For example, in some embodiments, a data processing unit configured in accordance with the present invention comprises a non-transitory computer-readable medium having accessible therefrom instructions defining a method for implementing management of operating conditions in accordance with an embodiment of the present invention (e.g., the method 450) and at least one data processing device (e.g., processor(s)) coupled to the non-transitory computer-readable medium for accessing and executing the instructions to implement such operating condition management functionality.

The method 450 can begin with an operation 452 of receiving one or more signals outputted from one or more fiber optic sensors each mounted on a respective one of a plurality of tubular members that jointly define a pipeline and a flow passage thereof through which fluid material flows, followed by an operation 454 of analyzing each one of received signals being performed. An objective of such analyzing is to identify at least a portion of one or more of the signals that indicates a potential flow affecting event for the fluid material within the flow passage of the pipeline. The method 450 can optionally include (not shown) an operation 451 of calibrating all or a portion of the sensors prior to such analyzing or during such analyzing. Such calibrating can include acquiring one or more reference signals from one or more of the sensors (e.g., in response to a reference signal provided to the one or more of the sensors). After such analyzing is performed, an operation 456 of correlating the signal(s) that indicate a potential flow affecting event for the fluid material within the flow passage of the pipeline to signal characterizing information for one or more known flow affecting events for the pipeline is performed. Analyzing the received signals can include monitoring a level of a signal characterizing parameter of each one of the received signals, with such correlating of signal(s) indicating the potential flow affecting event being initiated in response to determining that the level of the signal characterizing parameter exceeds a prescribed threshold. Specific examples of such thresholds can include a pressure threshold, a temperature threshold, a strain, threshold, a stress threshold, a frequency level threshold and the like.

Specific examples of signals corresponding to such known flow affecting events (i.e., anomalistic reference signals) include, but are not limited to, a signal characterizing formation of a hole within a wall of one of the tubular members defining the flow passage of the pipeline (e.g., drilling of a hole), a signal characterizing a liquid being pumped into the pipeline through the wall of one of the tubular members, (e.g., to mask an unauthorized extraction from the fluid material flowing through the pipeline), a signal characterizing an article (e.g., metallic and/or man-made article) coming into contact with the wall of pipeline (e.g., a drill bit), a signal characterizing the pipeline shifting (i.e., moving) with respect to a support structure upon which the pipeline is supported, and a signal characterizing an obstruction within the flow passage of the pipeline.

Still referring to FIG. 19, after correlating the signal(s) that indicate a potential flow affecting event for the fluid material within the flow passage of the pipeline to signal characterizing information for one or more known flow affecting events for the pipeline, an operation 458 of outputting a flow affecting event indicating signal can be performed and/or an operation 450 of causing a flow change can be performed. The flow event indicating signal can provide an indication of the specific flow affecting event(s) determined to be present. Examples of causing the flow change include causing flow of the fluid material within the pipeline to be terminated and causing flow of the fluid material within the pipeline to be altered from flowing through a current segment of the pipeline to a different segment of the pipeline (e.g., by issuing a signal that actuates a valve between a plurality of segments of the pipeline).

Correlating the signal(s) that indicate a potential flow affecting event for the fluid material within the flow passage of the pipeline to signal characterizing information for one or more known flow affecting events for the pipeline can include assessing the signal(s) that indicate a potential flow affecting event for the fluid material within the flow passage of the pipeline (e.g., a portion thereof (i.e., a signature thereof)) with respect to reference signal that each characterize a respective one of a plurality of known flow affecting events. In this respect, such correlating can include deriving one or more numeric values from the pipeline operation characterizing information signal that define a numeric signature thereof and computing a numeric deviation value between the numeric signature of the pipeline operation characterizing information signal and a numeric signature corresponding to each one of the known flow affecting events.

Such characterizing of the known flow affecting events thus involves comparing a quantitative characteristic of the signal(s) that indicate a potential flow affecting event for the fluid material within the flow passage of the pipeline to a corresponding quantitative characteristic of one or more reference signals. Examples of such reference signals include, but are not limited to, a signal characterizing a fluid flowing through the pipeline, a signal characterizing the fluid flowing through the pipeline exhibiting change in pressure and/or temperature of a known typical amount (e.g., an amount corresponding to a respective signal characterizing a baseline operating condition), a signal characterizing the fluid flowing through the pipeline exhibiting change in temperature of a known typical amount, a signal characterizing a change in ambient air temperature of a known typical amount and a signal characterizing a change in tubular member wall temperature of a known typical amount. In this respect, each signal that indicates a potential flow affecting event for the fluid material within the flow passage of the pipeline can represent a respective detected flow affecting event signature and the signal characterizing information for each one of the known flow-affecting events can represent a respective reference flow affecting event signature. Thus, in view of the disclosures made herein, a skilled person will appreciate that correlating of sensor signals in accordance with embodiments of the present invention can include analysis of such signatures with the objective of determining a match therebetween.

Figure 20:
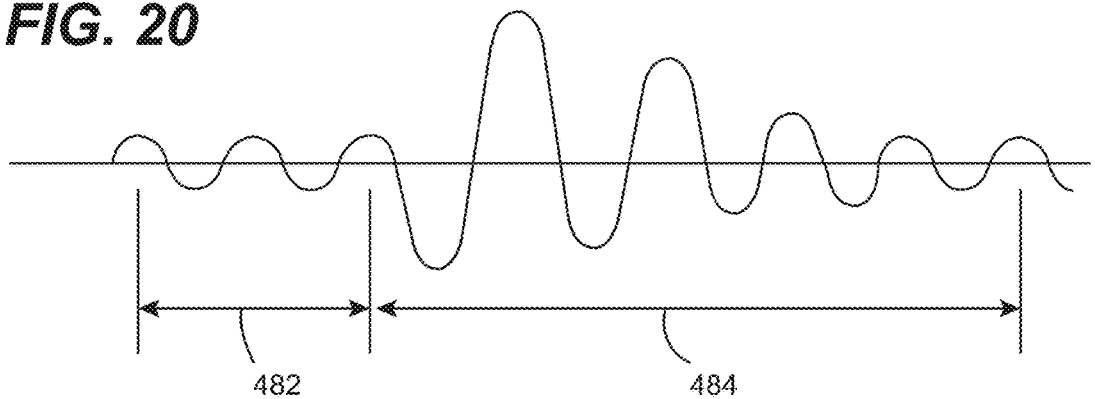
FIGS. 20-22 each show a resultant frequency response (i.e., signature) corresponding to one or more respective flow affecting events, which are each shown relative to a baseline frequency response.
Figure 21:
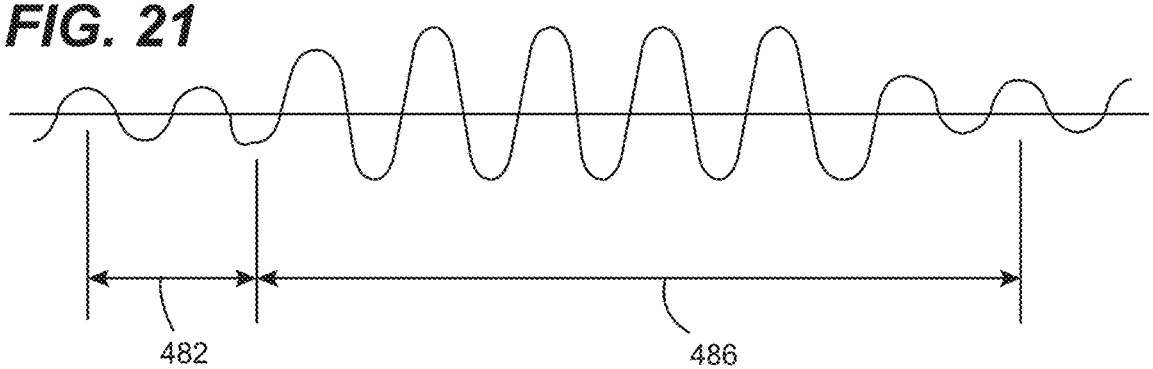
Figure 22:
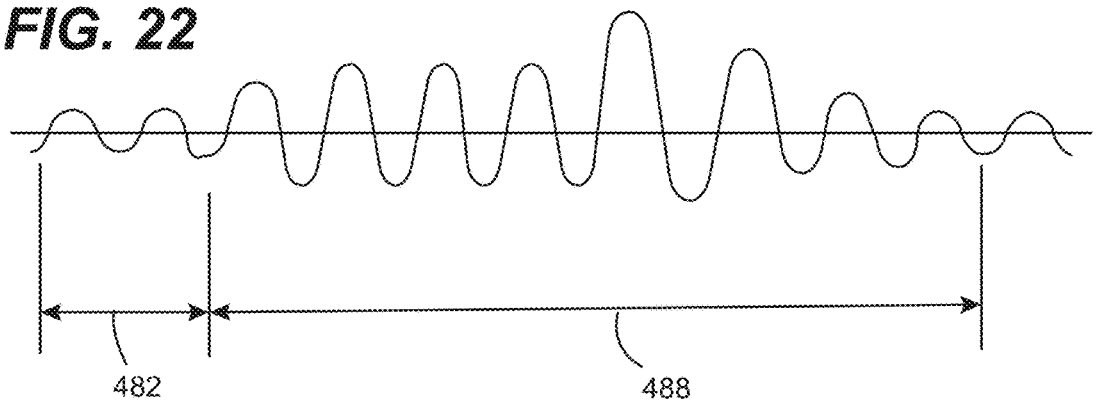

FIGS. 20-22 each show a resultant frequency response (i.e., signature) corresponding to one or more flow affecting events, which are each shown relative to a baseline frequency response 482 (i.e., normal operating conditions). FIG. 20 shows a resultant frequency response 484 corresponding to an event such as, for example, an impact on a pipeline (e.g., an article being impinged against a pipeline). FIG. 21 shows a resultant frequency response 486 corresponding to an event such as, for example, a machinery or apparatus acting on the pipeline (e.g., a drilling of a hole in a wall of a pipeline). FIG. 22 shows a resultant frequency response 488 corresponding to an event such as, for example, a shift of the pipeline resulting from a terrain-based (e.g., seismic) event machinery.

Figure 23:
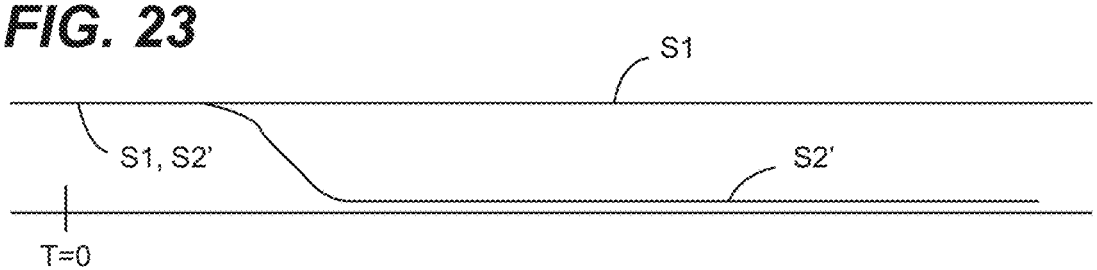
FIG. 23 shows a time-based view of two sensors indicating a change in a normalized or baselined operating condition for a given set of sensors.

FIG. 23 shows a time-based view of two sensors indicating a change in a normalized or baselined operating condition for a given set of sensors. Temperature, pressure, stress and strain are examples or a normalized or baselined operating condition. Such a change in the normalized or baselined operating condition as indicated by a particular sensor relative to one or more upstream sensors can indicate a condition such as an unauthorized extraction of a fluid material (e.g., processed fluid or gas such as natural gas or gasoline or diesel fuel) within a pipeline and/or unauthorized introduction of a fluid material (e.g., a theft-concealing replacement fluid such as water) into the pipeline.

The operations of causing the change in flow of the fluid material through the flow passage of the pipeline and causing the signal characterizing the at least one of the known flow-affecting events to be transmitted can be initiated by one or more trigger conditions. One example of such a trigger condition includes correlating a pipeline operation characterizing information signal of the one or more of the sensors to the signal characterizing information for one or more known flow affecting events and, within a prescribed duration of time from such correlating to the signal characterizing information for the one or more known flow affecting events, detecting a change in pressure of the fluid material flowing through the flow passage of the pipeline in excess of a designated pressure change threshold. Another example of such a trigger condition includes correlating the pipeline operation characterizing information signal of the at least one sensor to signal characterizing information corresponding to a hole being formed within a wall defining an exterior surface of the pipeline and, within a prescribed duration of time from such correlating to the signal characterizing information corresponding to the hole being formed, correlating the pipeline operation characterizing information signal of the one or more of the sensors to signal characterizing information corresponding to a liquid being pumped into the pipeline through the wall.

Figure 24:
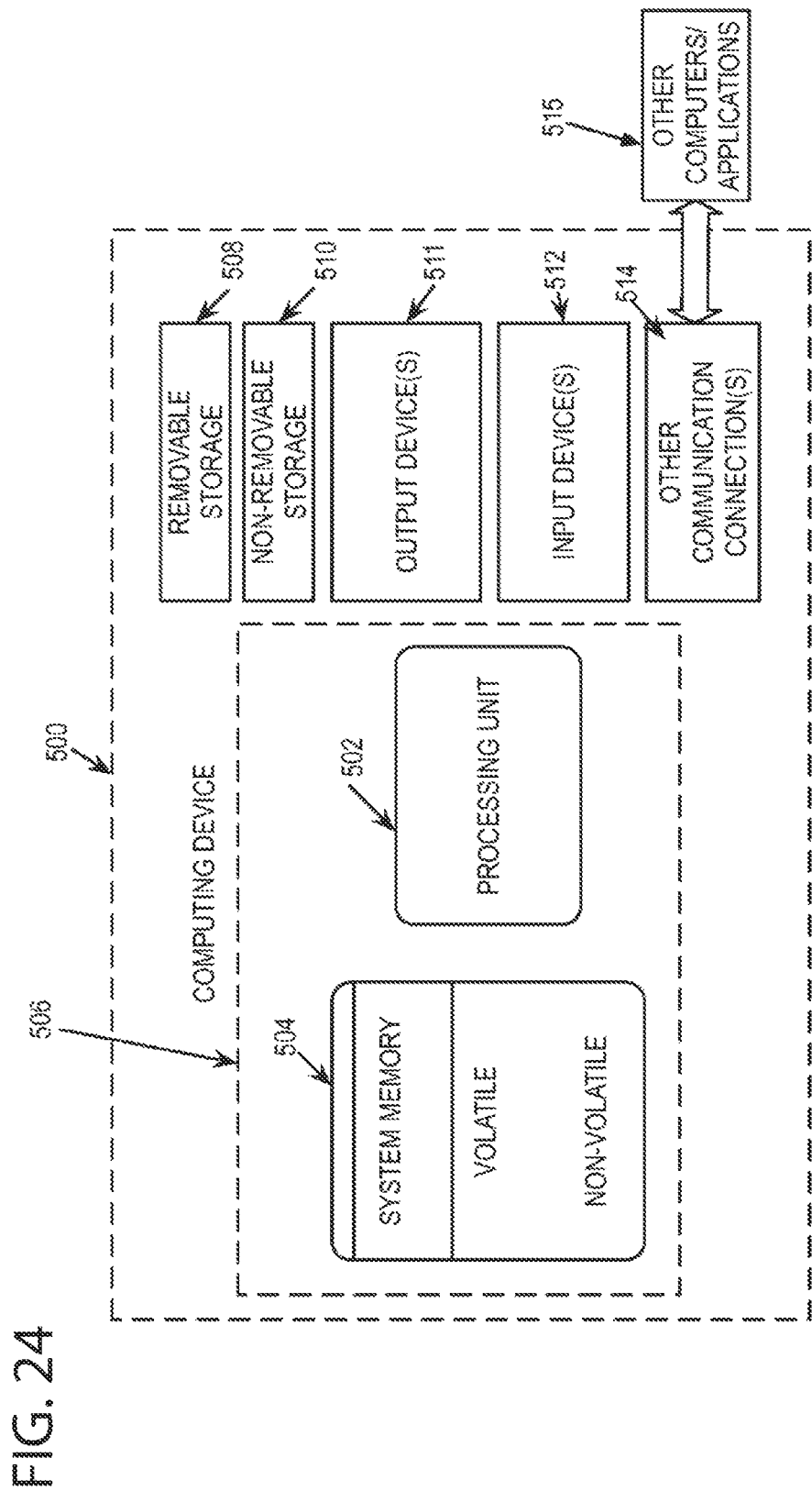
FIG. 24 is a diagrammatic view showing a first embodiment of a data processing apparatus configured in accordance with an embodiment of the present invention.

As shown in FIG. 24, a first embodiment of a data processing apparatus (e.g., an optical sensing module or data processing unit, which can consist of or comprise a server) to use for implementing one or more parts of a pipeline flow event management system configured in accordance with an embodiment of the present invention includes a data processing apparatus, such as data processing apparatus 500. In its most basic configuration, data processing apparatus 500 typically includes at least one processing unit 502 and memory 504. Depending on the exact configuration and type of data processing apparatus, memory 504 may be volatile (such as RAM), non-volatile (such as ROM, flash memory, etc.) or some combination of the two. This most basic configuration is illustrated in FIG. 24 by dashed line 506. In view of the disclosures made herein, a skilled person will appreciate that data processing apparatus 500 can be configured for providing functionality of a pipeline flow event management system in accordance with an embodiment of the present invention (e.g., an optical sensing module or data processing unit, as disclosed herein). For example, the data processing apparatus 500 can access and execute a set of instructions configured for implementing management of operating conditions in accordance with embodiments of the present invention.

The data processing apparatus 500 may also have additional features/functionality. For example, device 500 may also include additional storage (removable and/or non-removable) including, but not limited to, magnetic or optical disks or tape. Such additional storage is illustrated in FIG. 24 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 500. Any such computer storage media may be part of device 500.

Data processing apparatus 500 includes one or more communication connections 514 that allow data processing apparatus 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Figure 25:
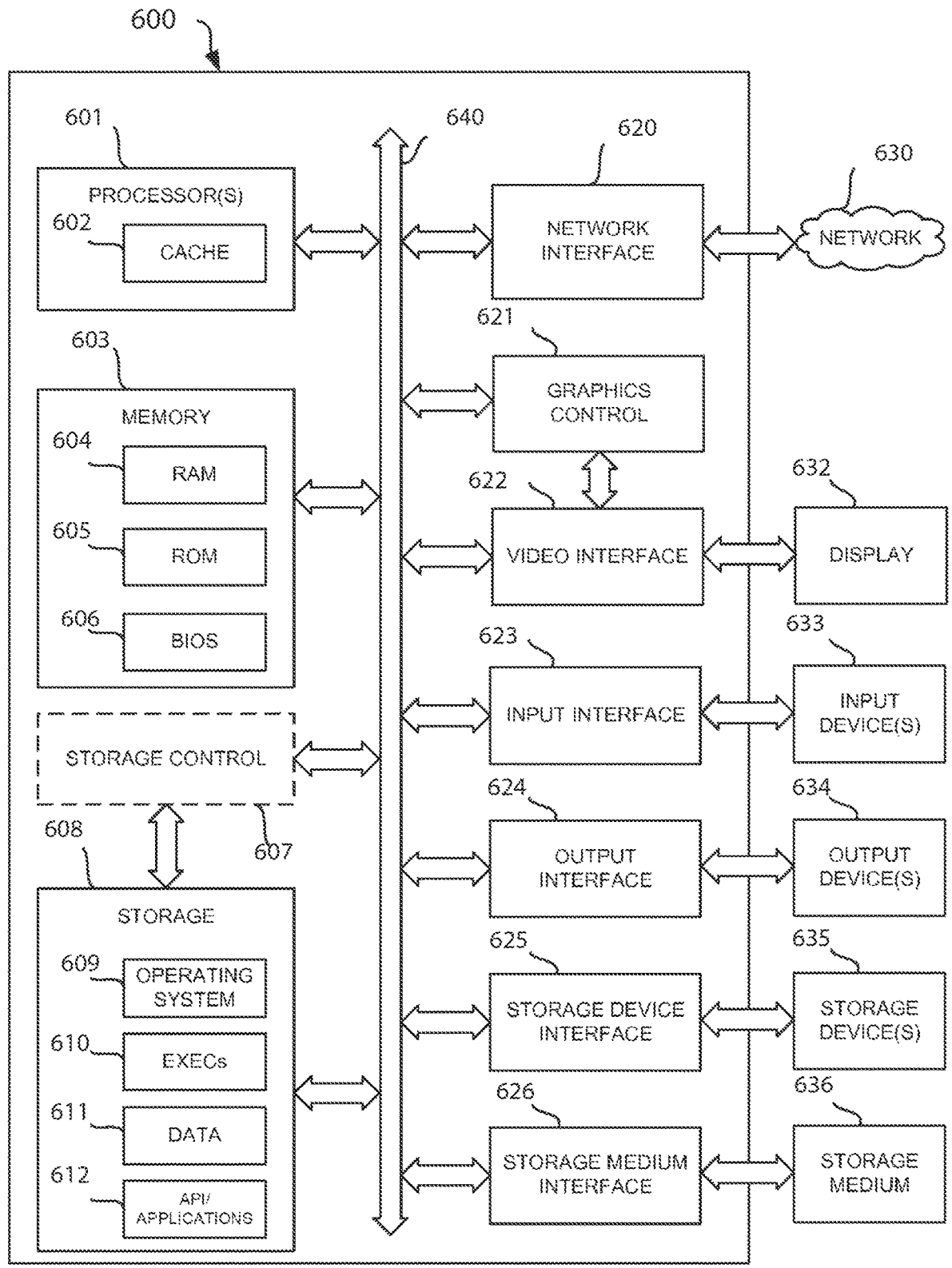
FIG. 25 is a diagrammatic view showing a second embodiment of a data processing apparatus configured in accordance with an embodiment of the present invention.

Apparatuses, systems and methods in accordance with embodiments of the inventive subject matter can be implemented in any number of different types of data processing apparatus (e.g., a server, a smart phone, and the like). To this end, FIG. 25 shows a diagrammatic representation of a second embodiment of a data processing apparatus 600 (e.g., an instance of one or more of user data processing apparatuses 1-*n*) within which a set of instructions can execute for causing a device to perform or execute any one or more of the aspects and/or methodologies of the present disclosure (e.g., the method 450 for implementing management of operating conditions). The components in FIG. 25 are examples only and do not limit the scope of use or functionality of any hardware, software, embedded logic component, or a combination of two or more such components implementing particular embodiments.

The data processing apparatus 600 can include a processor 601, a memory 603, and storage 608 that communicate with each other, and with other components, via a bus 640. The bus 640 can also link a display 632, one or more input devices 633 (which can, for example, include a keypad, a keyboard, a mouse, a stylus, etc.), one or more output devices 634, one or more storage devices 635, and various tangible storage media 636. All of these elements can interface directly or via one or more interfaces or adaptors to the bus 640. For instance, the various tangible storage media 636 can interface with the bus 640 via storage medium interface 626. Data processing apparatus 600 can have any suitable physical form, including but not limited to one or more integrated circuits (ICs), printed circuit boards (PCBs), mobile handheld devices (such as mobile cellular telephones, tablets, or personal digital assistants (PDAs)), laptop or notebook computers, distributed computer systems, computing grids, or servers. All or a portion of the elements 601-636 can be housed in a single unit (e.g., a smart phone housing, a tablet housing, or the like).

Processor(s) 601 (or central processing unit(s) (CPU(s))) optionally contains a cache memory unit 602 for temporary local storage of instructions, data, or computer addresses. Processor(s) 601 are configured to assist in execution of computer readable instructions (i.e., a set of instructions). Data processing apparatus 600 can provide functionality as a result of the processor(s) 601 executing software embodied in one or more tangible computer-readable storage media, such as memory 603, storage 608, storage devices 635, and/or storage medium 636. The computer-readable media can store software that implements particular embodiments of the inventive subject matter, and processor(s) 601 can execute the software. Memory 603 can read the software from one or more other computer-readable media (such as mass storage device(s) 635, 636) or from one or more other sources through a suitable interface, such as network interface 620. The software can cause processor(s) 601 to carry out one or more processes or one or more steps of one or more processes described or illustrated herein. Carrying out such processes or steps can include defining data structures stored in memory 603 and modifying the data structures as directed by the software.

The memory 603 can include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 can act to communicate data and instructions unidirectionally to processor(s) 601, and RAM 604 can act to communicate data and instructions bidirectionally with processor(s) 601. ROM 605 and RAM 604 can include any suitable tangible computer-readable media described below. In one example, a basic input/output system 606 (BIOS), including basic routines that help to transfer information between elements within data processing apparatus 600, such as during start-up, can be stored in the memory 603.

Fixed storage 608 is connected bidirectionally to processor(s) 601, optionally through storage control unit 607. Fixed storage 608 provides additional data storage capacity and can also include any suitable tangible computer-readable media described herein. Storage 608 can be used to store operating system 609, EXECs 610 (executables), data 611, APV applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 can, in appropriate cases, be incorporated as virtual memory in memory 603.

In one example, storage device(s) 635 can be removably interfaced with data processing apparatus 600 (e.g., via an external port connector (not shown)) via a storage device interface 625. Particularly, storage device(s) 635 and an associated machine-readable medium can provide nonvolatile and/or volatile storage of machine-readable instructions, data structures, program modules, and/or other data for the data processing apparatus 600. In one example, software can reside, completely or partially, within a machine-readable medium on storage device(s) 635. In another example, software can reside, completely or partially, within processor(s) 601.

Bus 640 connects a wide variety of subsystems. Herein, reference to a bus can encompass one or more digital signal lines serving a common function, where appropriate. Bus 640 can be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Preferably, the data processing apparatus 600 is configured to determine a location at which it is currently positioned. To this end, the data processing apparatus 600 can include a set of instructions for determining such location. A Global Positioning System (GPS) application accessible from within storage and/or memory of the data processing apparatus 600 (e.g., as an application accessible from within storage or memory) is an example of such a set of instructions for determining such location. In some embodiments, the set of instructions for determining such location cause at least a portion of information necessary for determining such location to be obtained from an external apparatus or system (e.g., via a network connection). Preferably, the location can be provided in the form of coordinates and/or a civic address.

Data processing apparatus 600 can also include an input device 633. In one example, a user of data processing apparatus 600 can enter commands and/or other information into data processing apparatus 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a micro-phone, a voice response system, etc.), an optical scanner, a video or still image capture device (e.g., a camera), and any combinations thereof. Input device(s) 633 can be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when data processing apparatus 600 is connected to network 630, data processing apparatus 600 can communicate with other devices, specifically mobile devices and enterprise systems, connected to network 630. Communications to and from data processing apparatus 600 can be sent through network interface 620. For example, network interface 620 can receive incoming communications (such as requests or responses from other devices) in the form of one or more packets (such as Internet Protocol (IP) packets) from network 630, and data processing apparatus 600 can store the incoming communications in memory 603 for processing. Data processing apparatus 600 can similarly store outgoing communications (such as requests or responses to other devices) in the form of one or more packets in memory 603 and communicated to network 630 from network interface 620. Processor(s) 601 can access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two data processing apparatuses, and any combinations thereof. A network, such as network 630, can employ a wired and/or a wireless mode of communication. In general, any network topology can be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, data processing apparatus 600 can include one or more other peripheral output devices 634 including, but not limited to, an audio speaker, a printer, and any combinations thereof. Such peripheral output devices can be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, data processing apparatus 600 can provide functionality as a result of logic hardwired or otherwise embodied in a circuit, which can operate in place of or together with software to execute one or more processes or one or more steps of one or more processes described or illustrated herein. Reference to software in this disclosure can encompass logic, and reference to logic can encompass software. Moreover, reference to a computer-readable medium (also sometimes referred to as machine-readable medium" can encompass a circuit (such as an IC) storing software for execution, a circuit embodying logic for execution, or both, where appropriate. The present disclosure encompasses any suitable combination of hardware, software, or both.

The term "computer-readable medium" should be understood to include any structure that participates in providing data that can be read by an element of a computer system. Such a medium can take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Those of skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the inventive subject matter.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of data processing apparatuses, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, Hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

The previous description of the disclosed embodiments is provided to enable any person skilled in the art to make or use the inventive subject matter. Various modifications to these embodiments will be readily apparent to those skilled in the art, and the generic principles defined herein can be applied to other embodiments without departing from the spirit or scope of the inventive subject matter. Thus, the inventive subject matter is not intended to be limited to the embodiments shown herein but is to be accorded the widest scope consistent with the principles and novel features disclosed herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A method of protecting against theft of a substance flowing through a pipeline, comprising:
    receiving at least one signal outputted from at least one fiber optic sensor mounted on the pipeline, wherein the pipeline includes a flow passage through which fluid material flows;
    analyzing the at least one received signal to identify at least a portion of the at least one received signal indicating a potential flow affecting event for the fluid material within the flow passage;
    correlating the at least a portion of the at least one received signal indicating the potential flow affecting event to at least one anomalistic reference signal characterizing at least one activity indicative of theft of a substance flowing through the flow passage; and
    outputting a signal conveying information indicative of the at least one activity indicative of theft.

2. The method of claim 1 wherein said analyzing that at least one received signal includes:
    monitoring a level of a signal characterizing parameter of the at least one received signal; and
    initiating said correlating of the at least a portion of the at least one received signal indicating the potential flow affecting event in response to determining that the level of the signal characterizing parameter exceeds a prescribed threshold.

3. The method of claim 2 wherein the at least a portion of the at least one received signal indicating the potential flow affecting event quantitatively characterizes at least one of:
    a level of longitudinal strain in a wall defining the flow passage; and
    a level of hoop strain in the wall.

4. The method of claim 3 wherein analyzing the at least one received signal to identify the at least a portion of the at least one received signal indicating the potential flow affecting event for the fluid material within the flow passage includes comparing the at least a portion of the at least one received signal indicating the potential flow affecting event to a corresponding quantitative characteristic of at least one baseline operating condition reference signal.

5. The method of claim 4 wherein correlating the at least a portion of the at least one received signal indicating the potential flow affecting event to the at least one anomalistic reference signal includes comparing a quantitative characteristic of the at least a portion of the at least one received signal indicating the potential flow affecting event to a corresponding quantitative characteristic of at least one anomalistic reference signal.

6. The method of claim 5, further comprising:
    performing calibration of the at least one fiber optic sensor at least one of prior to said analyzing and during said analyzing, wherein said calibrating includes acquiring at least one of the at least one baseline operating condition reference signal from the at least one fiber optic sensor.

7. The method of claim 1 wherein the at least a portion of the at least one received signal indicating the potential flow affecting event quantitatively characterizes at least one of:
    a level of longitudinal strain in a wall defining the flow passage; and
    a level of hoop strain in the wall.

8. The method of claim 1 wherein correlating the at least a portion of the at least one received signal indicating the potential flow affecting event to the at least one anomalistic reference signal includes comparing a quantitative characteristic of the at least a portion of the at least one received signal indicating the potential flow affecting event to a corresponding quantitative characteristic of at least one anomalistic reference signal.

9. The method of claim 8, further comprising:
    performing calibration of the at least one fiber optic sensor at least one of prior to said analyzing and during said analyzing, wherein said calibrating includes acquiring at least one of the at least one baseline operating condition reference signal from the at least one fiber optic sensor.

10. The method of claim 9 wherein the at least one baseline operating condition reference signal includes at least one of:
    a signal characterizing a fluid flowing through the pipeline;
    a signal characterizing the fluid flowing through the pipeline exhibiting change in pressure of a known typical amount;
    a signal characterizing the fluid flowing through the pipeline exhibiting change in temperature of a known typical amount;
    a signal characterizing a change in ambient air temperature of a known typical amount; and
    a signal characterizing a change in temperature of a known typical amount within a wall defining the flow passage.

11. The method of claim 1, further comprising:
    performing calibration of the at least one fiber optic sensor at least one of prior to said analyzing and during said analyzing, wherein said calibrating includes acquiring at least one baseline operating condition reference signal from the at least one fiber optic sensor.

12. The method of claim 11 wherein the at least one baseline operating condition reference signal includes at least one of:
- a signal characterizing a fluid flowing through the pipeline;
- a signal characterizing the fluid flowing through the pipeline exhibiting change in pressure of a known typical amount;
- a signal characterizing the fluid flowing through the pipeline exhibiting change in temperature of a known typical amount;
- a signal characterizing a change in ambient air temperature of a known typical amount; and
- a signal characterizing a change in temperature of a known typical amount within a wall defining the flow passage.

13. The method of claim 1 wherein the at least one anomalistic reference signal corresponds to at least one of:
- a signal characterizing forming an opening within a wall defining the flow passage;
- a signal characterizing a liquid being pumped into the pipeline at a location adjacent to the opening; and
- a signal characterizing a metallic article coming into contact with the wall.

14. A pipeline system, comprising:
- a pipeline having a flow passage therein through which fluid material flows;
- a plurality of sensors mounted on an exterior surface of the pipeline; and
- a data processing unit coupled to each of the sensors for enabling reception of signals therefrom, wherein the data processing unit is adapted to receive a signal corresponding to pipeline operation characterizing information generated by at least one of the sensors, to correlate the pipeline operation characterizing information signal to at least one anomalistic reference signal characterizing at least one activity indicative of theft of a substance flowing through the pipeline; and to cause a signal conveying information derived from correlation of the pipeline operation characterizing information signal to the at least one anomalistic reference signal to be transmitted.

15. The pipeline system of claim 14 wherein the at least one anomalistic reference signal corresponds to at least one of:
- a signal characterizing forming an opening within a wall defining the flow passage;
- a signal characterizing a liquid being pumped into the pipeline at a location adjacent to the opening; and
- a signal characterizing a metallic article coming into contact with the wall.

16. The pipeline system of claim 14 wherein the at least one anomalistic reference signal indicates at least one of:
- an opening being formed within a wall defining the flow passage;
- a liquid being pumped into the pipeline at a location adjacent to the opening; and
- a metallic article coming into contact with the wall.

17. The pipeline system of claim 14 wherein the pipeline operation characterizing information signal characterizes at least one of:
- a level of longitudinal strain in a wall defining the flow passage; and
- a level of hoop strain in the wall.

18. The pipeline system of claim 14 wherein the data processing unit being adapted to correlate the pipeline operation characterizing information signal to the at least one anomalistic reference signal includes the data processing unit being adapted to:
- derive at least one numeric value from the pipeline operation characterizing information signal that define a numeric signature thereof; and
- compute a numeric deviation value between the numeric signature of the pipeline operation characterizing information signal and a numeric signature corresponding to each one of the at least one activity indicative of theft.

19. The pipeline system of claim 14 wherein the at least one activity indicative of said theft of the substance flowing through the pipeline include at least one of:
- an opening being formed within a wall defining the flow passage;
- a liquid being pumped into the pipeline at a location adjacent to the opening; and
- a metallic article coming into contact with the wall.

20. The pipeline system of claim 14 wherein the at least one of the data processing unit being adapted to cause the signal conveying information derived from correlation of the pipeline operation characterizing information signal to the at least one anomalistic reference signal to be transmitted includes the data processing unit being adapted to at least one of:
- correlate the pipeline operation characterizing information signal of the at least one of the sensors to the at least one anomalistic reference signal characterizing information for the at least one of the known flow affecting events and, within a prescribed duration of time from said correlating to the at least one anomalistic reference signal characterizing information for the at least one of the known flow affecting events, to detect a change in pressure of the fluid material flowing through the flow passage of the pipeline in excess of a designated pressure change threshold; and
- correlate the pipeline operation characterizing information signal of the at least one of the sensors to an anomalistic reference signal corresponding to an opening being formed within a wall defining an exterior surface of the pipeline and, within a prescribed duration of time from said correlating to the anomalistic reference signal corresponding to the opening being formed, the data processing unit being adapted to correlate the pipeline operation characterizing information signal of the at least one of the sensors to an anomalistic reference signal corresponding to a liquid being pumped into the pipeline at a location adjacent to the opening.

21. A pipeline security apparatus, comprising:
- at least one sensor adapted for being mounted on an exterior surface of a pipeline, wherein the at least one sensor outputs a signal characterizing a force being exerted on the pipeline; and
- a data processing unit coupled to the at least one sensor for receiving the signal outputted therefrom, wherein the data processing unit is adapted to receive the signal characterizing the force, to correlate the signal characterizing the force to at least one anomalistic reference signal characterizing at least one activity indicative of theft of a substance flowing through the pipeline and to cause a signal conveying information derived from correlation of the signal characterizing the force to the at least one anomalistic reference signal characterizing the at least one activity indicative of theft to be transmitted.

22. The pipeline security apparatus of claim 21 wherein the at least one anomalistic reference signal corresponds to at least one of:
- a signal characterizing forming an opening within a wall defining an exterior surface of the pipeline;
- a signal characterizing a liquid being pumped into the pipeline at a location adjacent to the opening;
- a signal characterizing a metallic article coming into contact with the wall of the pipeline.

23. The pipeline security apparatus of claim 21 wherein the at least one anomalistic reference signal indicates at least one of:
- an opening being formed within a wall defining an exterior surface of the pipeline;
- a liquid being pumped into the pipeline at a location adjacent to the opening;
- and a metallic article coming into contact with the wall.

24. The pipeline security apparatus of claim 21 wherein the signal characterizing the force characterizes at least one of:
- a level of longitudinal strain in a wall defining an exterior surface of the pipeline; and
- a level of hoop strain in the wall defining an exterior surface of the pipeline.

25. The pipeline security apparatus of claim 21 wherein the data processing unit being adapted to correlate signal characterizing the force to the at least one anomalistic reference signal includes the data processing unit being adapted to:
- derive at least one numeric value from the pipeline operation characterizing information signal that define a numeric signature thereof; and
- compute a numeric deviation value between the numeric signature of the pipeline operation characterizing information signal and a numeric signature corresponding to each one of the at least one activity indicative of said theft of the substance flowing through the pipeline.

26. The pipeline security apparatus of claim 21 wherein the at least one activity indicative of said theft of the substance flowing through the pipeline includes at least one of:
- an opening being formed within a wall defining an exterior surface of the pipeline;
- a liquid being pumped into the pipeline at a location adjacent to the opening; and
- a metallic article coming into contact with the wall of the pipeline.

* * * * *